United States Patent [19]
Gum et al.

[11] Patent Number: 4,779,188
[45] Date of Patent: Oct. 18, 1988

[54] SELECTIVE GUEST SYSTEM PURGE CONTROL

[75] Inventors: Peter H. Gum, Poughkeepsie; Roger E. Hough, Highland; Peter H. Tallman; Thomas O. Curlee, III, both of Poughkeepsie, all of N.Y.

[73] Assignee: International Business Machines Corporation, Armonk, N.Y.

[21] Appl. No.: 110,620

[22] Filed: Oct. 19, 1987

Related U.S. Application Data

[63] Continuation of Ser. No. 947,350, Dec. 29, 1986, abandoned, and Ser. No. 561,614, Dec. 14, 1983, abandoned.

[51] Int. Cl.$^4$ .......................... G06F 9/44; G06F 9/32
[52] U.S. Cl. .................................................. 364/200
[58] Field of Search ... 364/200 MS File, 900 MS File

[56] References Cited

U.S. PATENT DOCUMENTS

| 4,004,278 | 1/1977 | Nagashima | 364/200 |
| 4,068,303 | 1/1978 | Morita | 364/200 |
| 4,241,401 | 12/1980 | De Ward et al. | 364/200 |
| 4,253,145 | 2/1981 | Goldberg | 364/200 |
| 4,347,565 | 8/1982 | Kaneda et al. | 364/200 |
| 4,456,954 | 6/1984 | Bullions, III et al. | 364/200 |

Primary Examiner—Gary V. Harkcom
Assistant Examiner—Christopher H. Lynt
Attorney, Agent, or Firm—Bernard M. Goldman

[57] ABSTRACT

The embodiments enable address translations for a virtual machine in the TLB (translation lookaside buffer) of a CPU to be retained from exiting a SIE (start interpretive execution) instruction to the next SIE entry to interpretive execution for the same guest (virtual machine CPU). Conditions are defined which determine when guest TLB entries must be invalidated. These conditions require invalidation of guest TLB entries only within and on entry to interpretive execution. A single invalidation of guest TLB entries on entry to interpretive execution is required for any number of conditions recognized while a CPU is not in interpretive execution state. For a guest in a virtual multiprocessor (MP) machine, an interlock is provided to allow the use of guest virtual addresses by host instruction simulation and the need for guest TLB invalidation is broadcast to all other real CPUs in a real MP system so that all guest TLBs on all real CPUs can be invalidated to maintain integrity. No broadcast or interlock is needed for a guest in a virtual uni-processor (UP) machine.

26 Claims, 13 Drawing Sheets

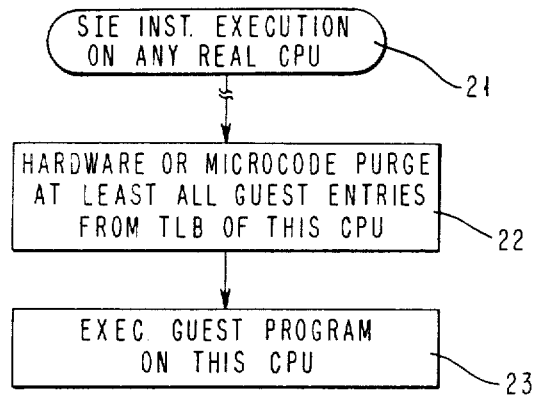
FIG. 5 (PRIOR ART ON SIE INVOCATION)
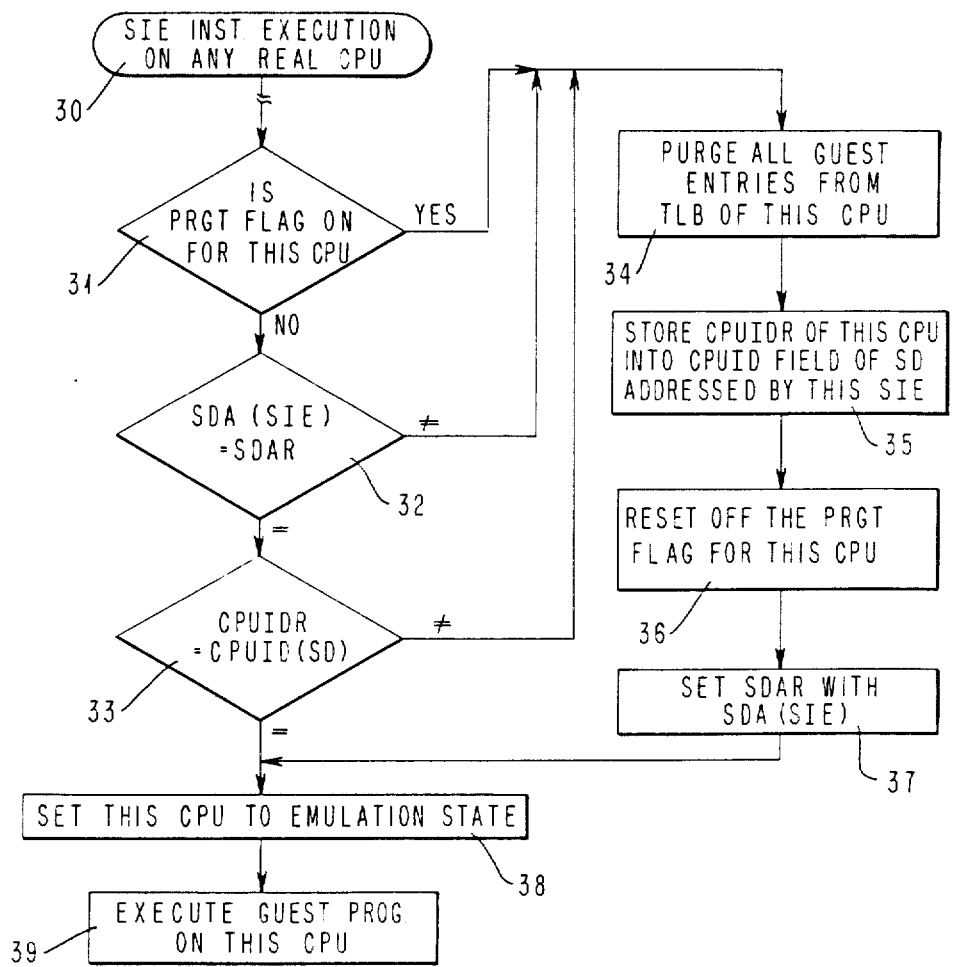
FIG. 6A (SIE INVOCATION, EMBODIMENT-1)

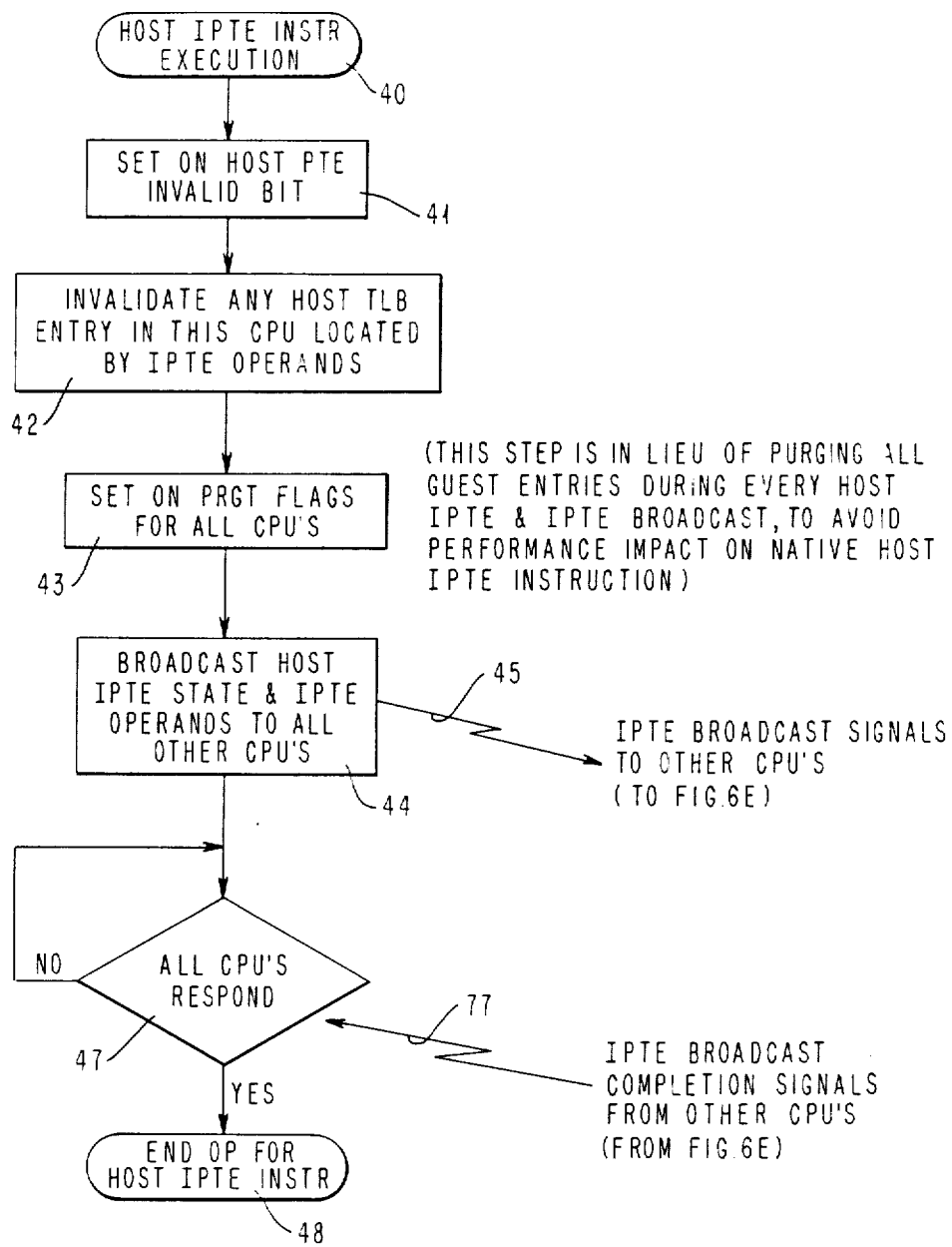

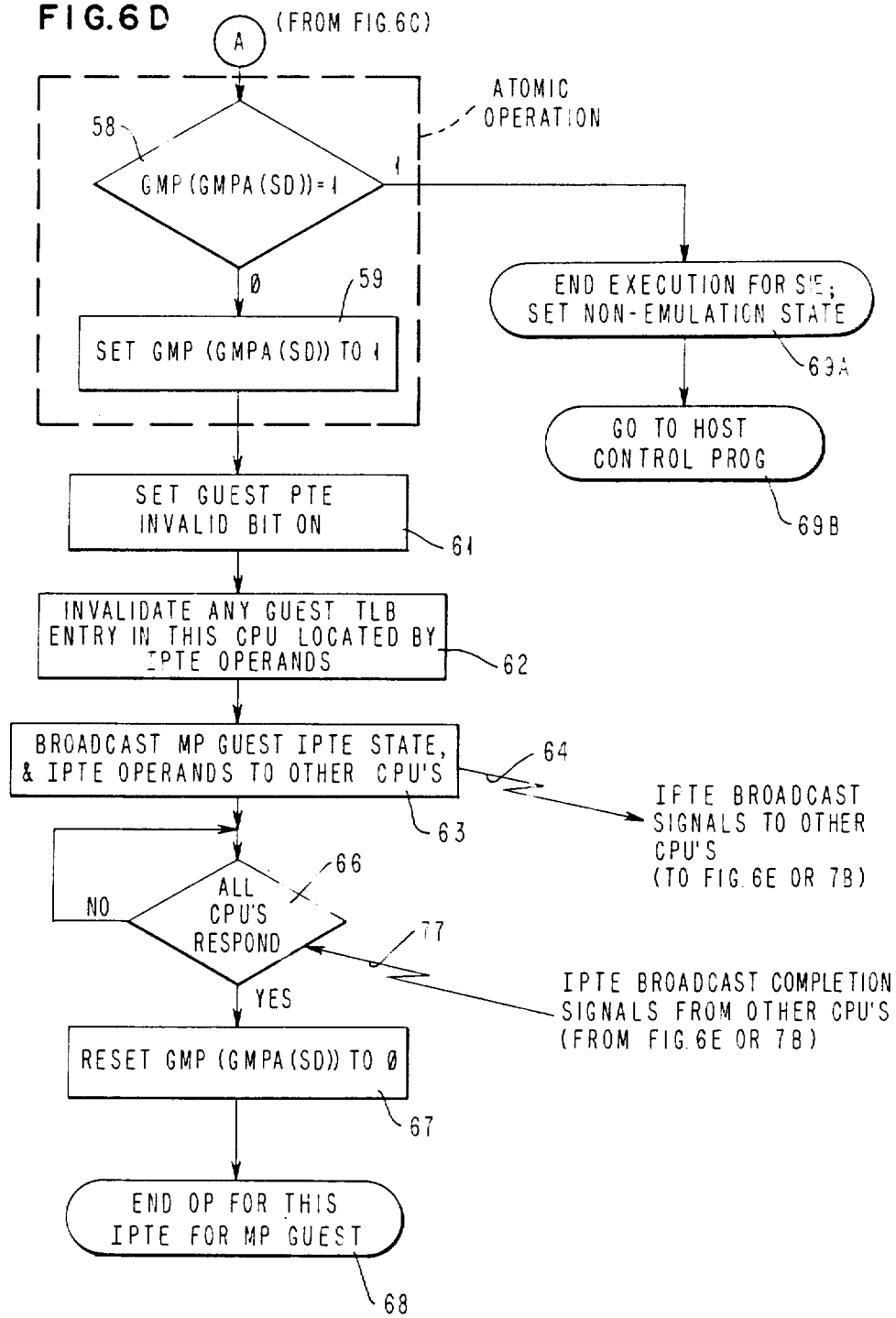

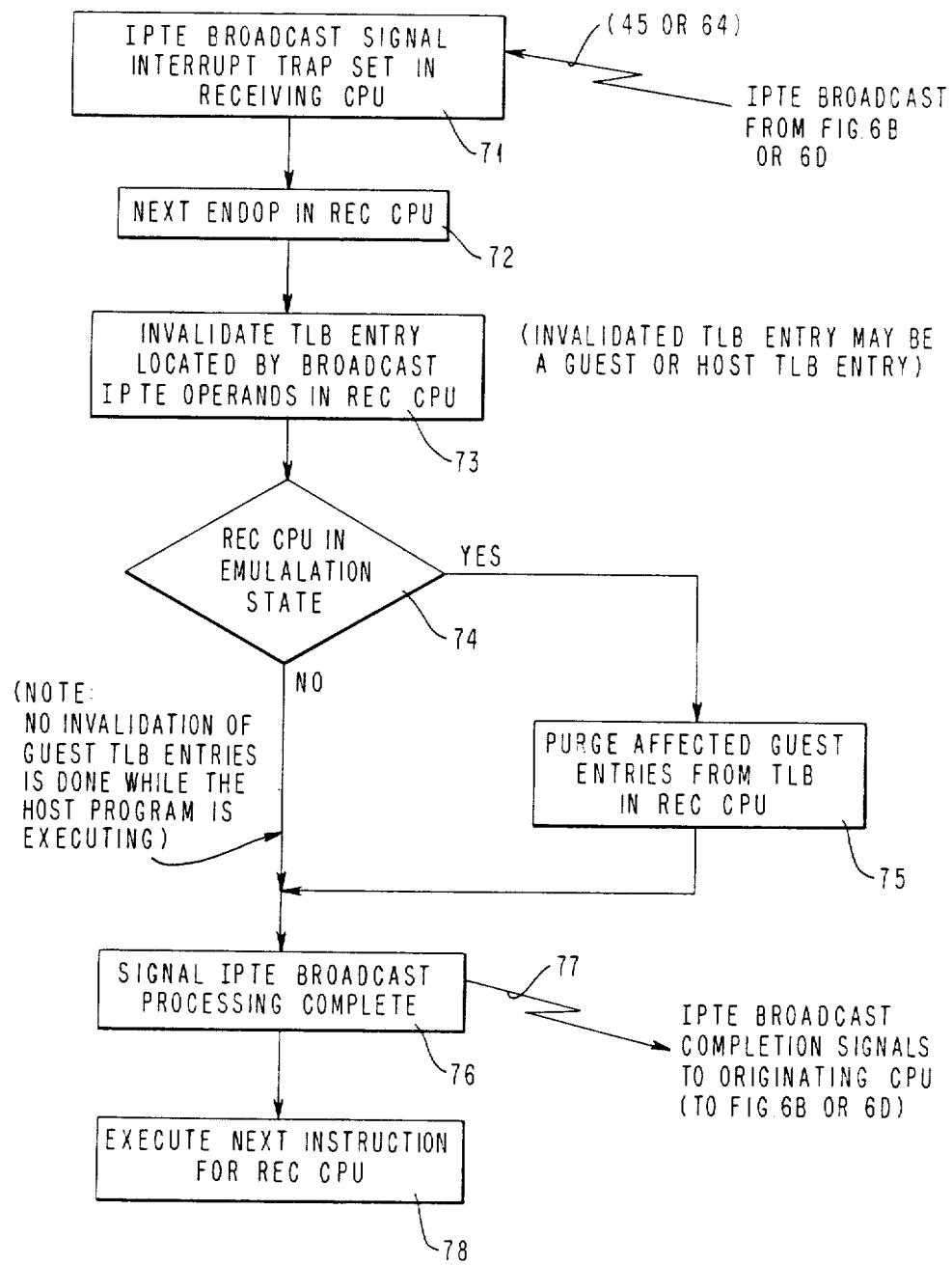

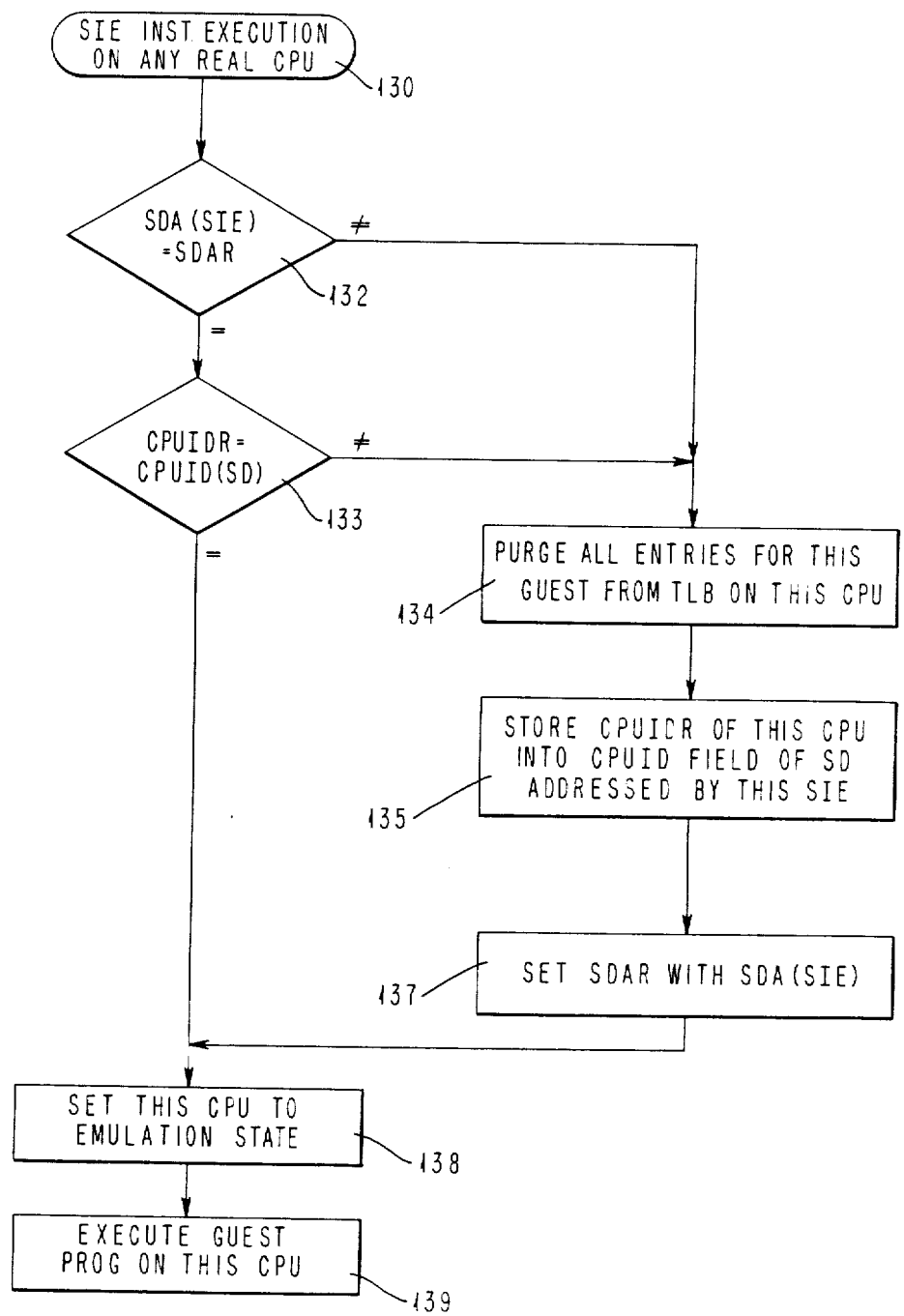

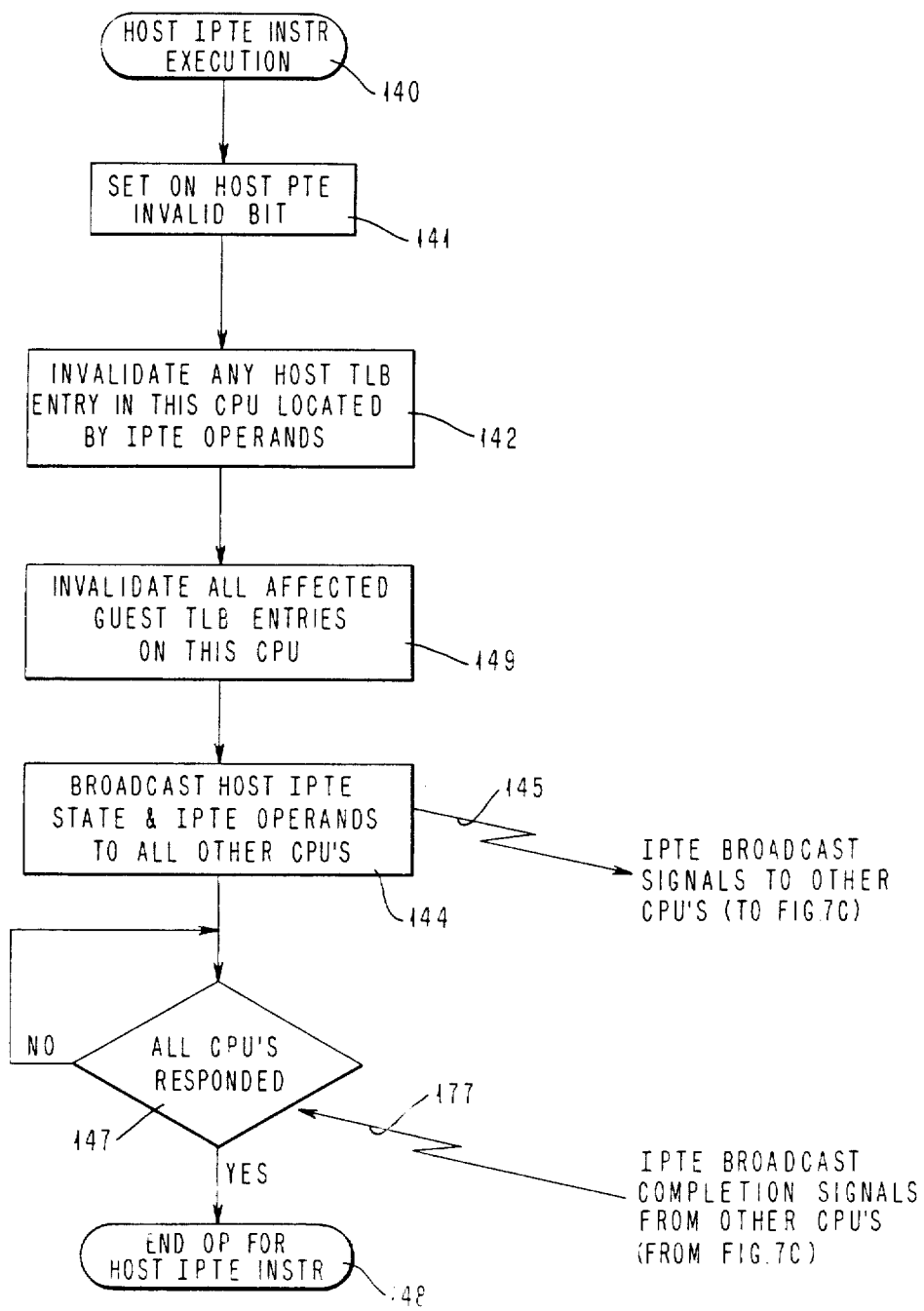

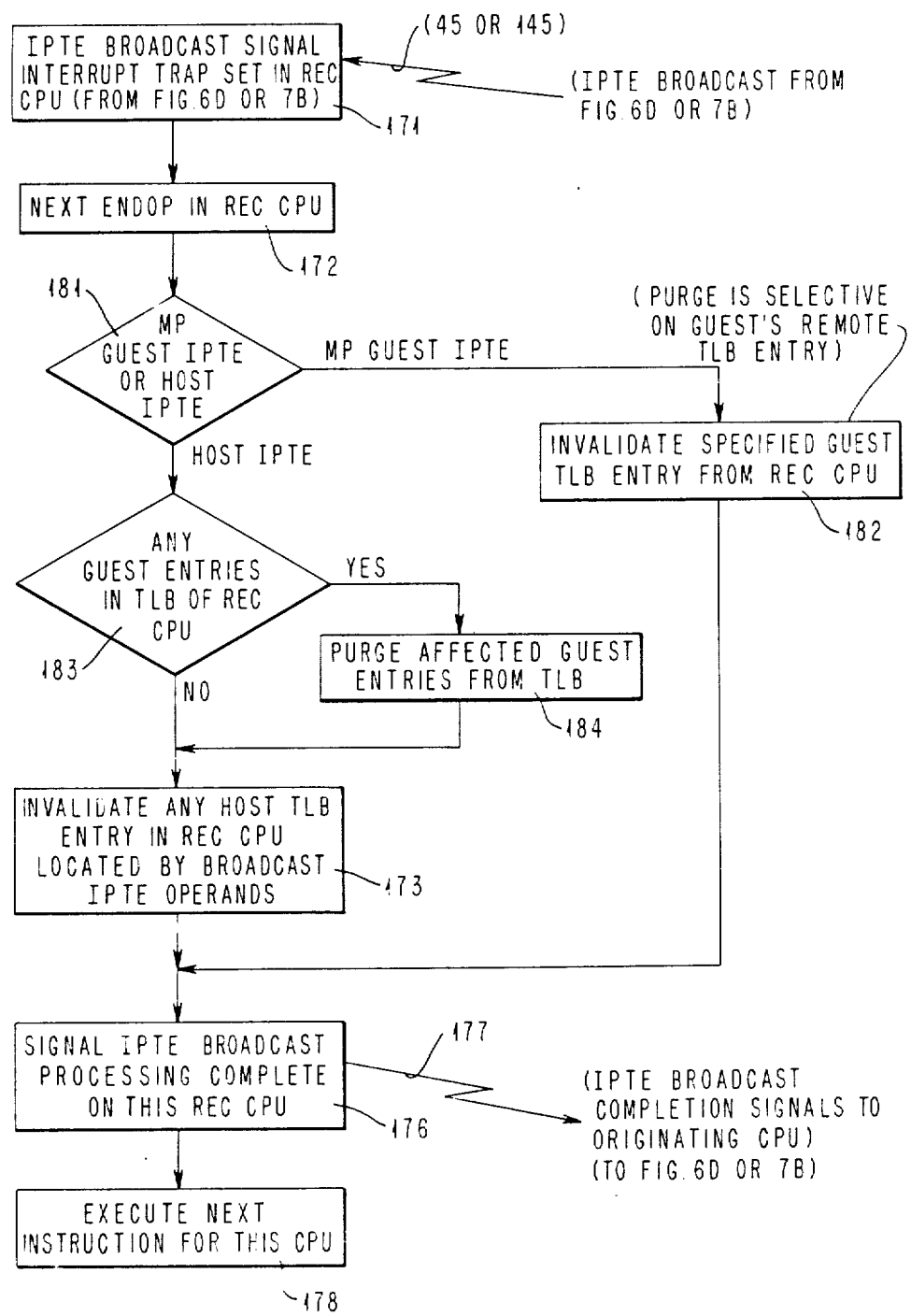

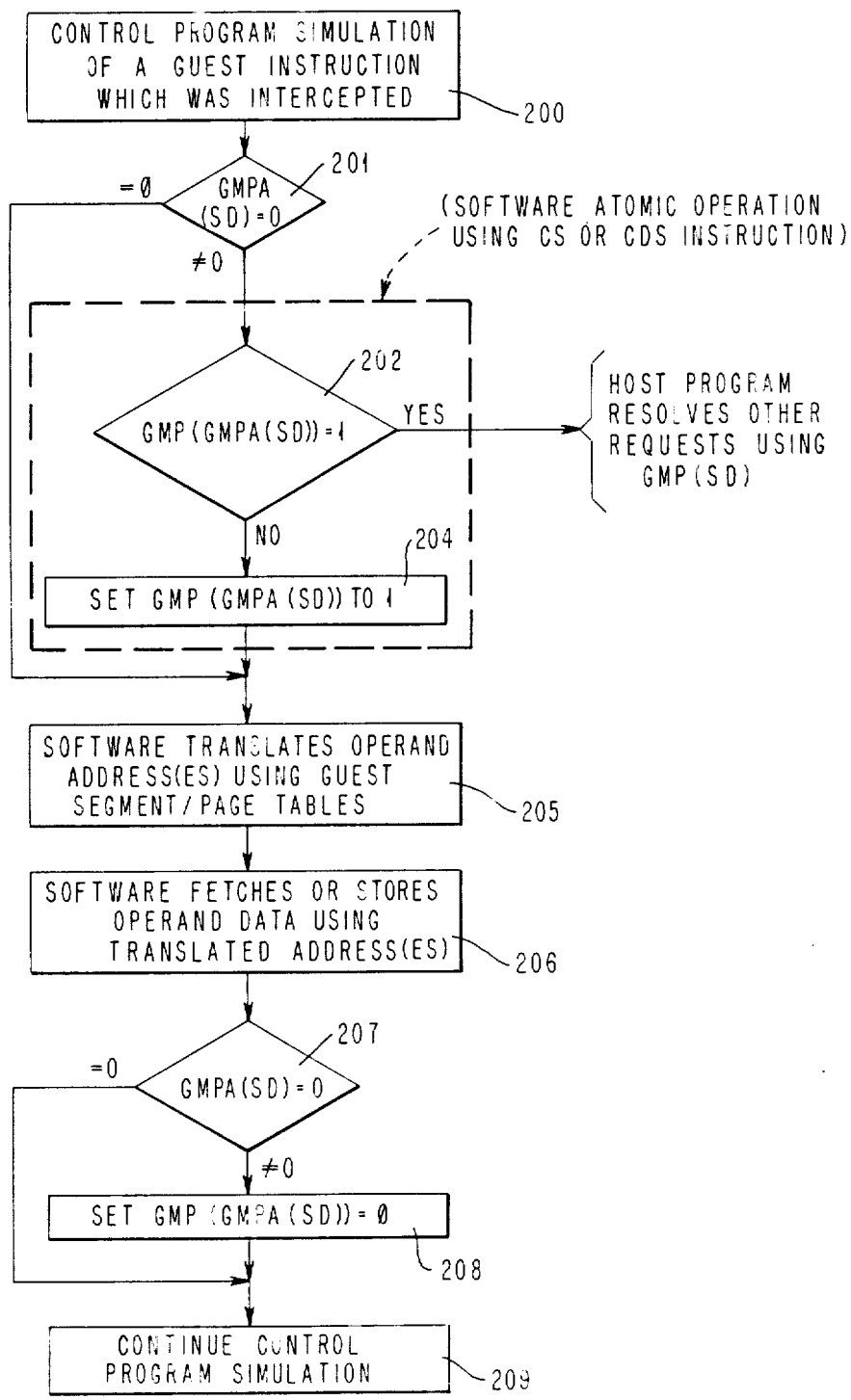

SELECTIVE GUEST SYSTEM PURGE CONTROL

This application is a continuation of prior applications having Ser. No. 947,350 filed on Dec. 29, 1986 now abandoned and Ser. No. 561,614 filed on Dec. 14, 1983 now abandoned with the same title and inventorship; and a claim of priority for the Dec. 14, 1983 date is made for this continuation application.

FIELD OF THE INVENTION

This specification generally relates to efficient purge control over the contents of translation lookaside buffers (TLBs) in a plurality of CPUs in a multiprocessor computer system to improve the performance of a virtual machine (VM) operating system in which a plurality of virtual systems may be concurrently emulated.

DESCRIPTION OF THE PRIOR ART

This specification incorporates by reference the specification of U.S. Pat. No. 4,456,954 filed June 15, 1981 by R. J. Bullions et al and assigned to the same assignee as the subject application. U.S. Pat. No. 4,456,954 describes a start interpretive execution (SIE) instruction which enables a virtual uniprocessor (UP) system to be emulated in a real UP or in a real multiprocessor (MP). A further description of interpretive execution can be found in an article in the IBM Journal of Research and Development, November 1983, entitled "System/370 Extended Architecture: Facilities For Virtual Machines".

In summary, SIE is described in the prior application as a privileged instruction which consists of an operation code and an operand address of a control block in main storage (MS), also herein called a state descriptive identifier (SDT). This control block is called a state description (SD). The SD contains a plurality of fields which receive values that define the state of a virtual system comprising a virtual CPU with a virtual storage and certain states for controlling how the virtual system is to operate on the real system. Hence, an SD defines a virtual uniprocessor (UP) system, which is also called a UP guest.

A plurality of SDs may exist in real main storage to respectively define a plurality of virtual UP systems, i.e. a plurality of UP guests. A real UP system may contain a pluralty of virtual UP systems, which are superimposed on the real CPU and on part of the real main storage. The plural virtual UP systems operated on the real system by serially executing SIE instructions that specify the UP guests by respectively locating their respective SDs. A process called invoking SIE occurs whenever a SIE instruction is executed in a host program's instruction stream. This process sets on an emulation mode state and enables a subset of microcode and hardware in the real CPU to support its operation for the virtual UP system invoked by the SIE instruction. After the SIE instruction, the guest program begins execution for the virtual UP system defined by the SIE instruction. The SIE instruction is considered to be in execution as long as its guest program is executing. A guest program execution may be terminated by any of a number of different conditions which terminate the concurrent SIE execution. SIE execution termination is by interruption or by interception.

SIE interruption includes all architecturally defined interruptions. SIE interceptions include those conditions which terminate SIE execution other than by interrupting conditions. For example, certain privileged instructions may intercept SIE execution. When SIE execution is terminated, a system host operating system program is invoked, such as a virtual machine control program like the IBM Virtual Machine/Extended Architecture (VM/XA) Migration Aid, Product No. 5664-169, control program.

The performance of SIE is enhanced by loading the CPU with many of the pararameter values in the SD when SIE is invoked, so that repetitious main storage accesses for these values are avoided. Such SD parameters include loading the CPU with the SD state mode field, guest main storage size and boundary limits, size of the guest storage segments and pages, and a prefix value to locate the guest CPU's prefix save area (PSA) in main storage containing the guest program status words (PSWs) and other predetermined fields.

Virtual UP systems (i.e. also called virtual UP guests) may also be provided in a real multiprocessor (MP) system comprised of a plurality of CPUs whch are tightly coupled to a common real main storage. In such real MP systems, the plurality of virtual UP systems may be defined by a respective plurality of SDs in real main storage in the same manner as may be done in a real UP system. Thus, each of the plurality of SDs defines a different virtual UP guest in the real MP system. Any one or more of the plurality of real CPUs in a MP may at any time be in emulation mode executing under a respective SIE instruction to allow plural virtual UP systems to simultaneously execute with different SDs in the real MP main storage.

When any UP guest executes in a real MP system, the UP guest may be dispatched first on one side of the real CPUs until the guest is intercepted (such as by going into an I/O wait state) or interrupted (such as by taking a host I/O operation). Thereafter the guest may be dispatched on another CPU when again ready to execute while its first CPU is busy executing some other program.

A consequence of a UP guest executing a program using virtual addresses on any CPU is that the virtual addresses require address translations which are performed and then retained in a translation lookaside buffer (TLB) in each executing CPU. The same UP guest may have address translations performed in different real CPUs on which the guest is dispatched.

The address translations are retained in the executing CPU's TLB during guest execution. After guest execution is temporarily stopped, it is not known whether the guest translations existing in TLB entries will later be needed, since they will not be needed if the guest is next dispatched to another CPU. It has previously been suggested in U.S. Pat. No. 4,456,954 that the guest TLB entries (but not the host TLB entries) be automatically invalidated when any guest or host program either is being dispatched, or a guest program is terminating SIE execution on any CPU, so that the next program on that CPU may immediately have the use of these vacated entries for its new address translations. Therefore, U.S. Pat. No. 4,456,954 always invalidated all guest TLB entries to obtain system integrity. Each dispatched program (host or any guest) on that CPU found the TLB entries used by the previously dispatched guest to have been invalidated. When the same guest was next dispatched on the same real CPU, it had to again retranslate some or all of the TLB entries that had been invalidated. On the other hand, the subject invention has found, and uses certain conditions that allow the TLB entries of a guest to be maintained valid between dispatches of the guest, in order to avoid the inefficiencies of TLB retranslation resulting from the prior methods.

SUMMARY OF THE INVENTION

This invention relates to the integrity of the contents of guest TLB entries in any real CPU of a real UP or MP system that allows the contents of guest TLB entries to be retained after the termination of the dispatch of a guest program on a real CPU and after the dispatch of the same or another program on that real CPU.

This invention involves the process of recognizing when the integrity of guest TLB entries is not affected by redispatching, and when the integrity of an entry is jeopardized by the invalidation of a host translation so that all guest TLB entries in a CPU that depend on that host translation can be invalidated. For example, whenever a host program invalidates a host page table entry, it may possibly affect a guest address translation existing in any CPU in the real system, so that invalidation must then be done to all affected guest TLB entries which address the same host page. But if the host program performs no host page table entry invalidation while it is dispatched, this invention allows each guest TLB entry in the real system to retain its existing address translations, so they may be used by a subsequent dispatch of the same guest without having the CPU duplicate the effort of again translating the same virtual addresses. This avoidance of guest retranslation can substantially enhance the performance of guest programs executed in a UP or MP system, such as guest programs in a virtual machine (VM) environment.

This invention uses the concept of a virtual MP system (also called a MP guest) for operation on a real MP system. A virtual MP system is defined by a plurality of associated SDs in which each SD defines a virtual CPU and the virtual MP tightly-coupled main storage. A virtual UP system (also called a UP guest) is defined by a single SD, in which the SD represents the UP's virtual CPU and its virtual main storage.

This invention operates with both virtual UP systems and virtual MP systems executing on either a real UP or a real MP system. A UP guest may at different times execute on more than one real CPU in a real MP, and each CPU may retain guest TLB entries after the UP guest has ended its execution thereon (perhaps temporarily), and the guest may later be dispatched on the same or another real CPU.

A UP guest executing on a real CPU may at any time issue a S/370 invalidate page table entry (IPTE) instruction to invalidate a virtual page table entry. The system must be assured that after a guest IPTE execution, no guest TLB entry containing an address translation using that invalidated guest page table entry can thereafter be used. This assurance is provided by a unique process of using new fields which include: (1) a last CPU address (last CPA) field put into each SD, and (2) one or more SD address (SDA) fields registered in each real CPU in the real MP. These fields are processed when invoking the execution of a SIE instruction to determine: (1) if the real CPU on which this UP guest is now dispatched is the same real CPU on which this guest was last dispatched, and (2) if this guest (represented by its SD address) was previously dispatched on this CPU. Both conditions (1) and (2) are needed on a real MP system to assure that all guest entries in the TLB previously provided by this UP guest have not been changed during any period in which this guest was not dispatched on that CPU.

Each guest MP is provided with a respective guest MP interlocking control block (GMP). The GMP prevents changes to the page table entries associated with guest virtual stoppage by its virtual CPUs, and by a host program acting for any of its virtual CPUs, while any of them is in the process of invalidating a virtual page table entry affecting the virtual storage of that MP guest, and while the host program performs an instruction simulation depend on the contents of guest page table entries. Each SD for a MP guest is provided with the same pointer (i.e. GMPA) to the common GMP for that virtual MP system. That is, each SD of a MP guest contains a GMPA (i.e. GMP address) to locate the associated GMP interlock field. Any guest program in that MP guest (or the host program acting for a guest program), which is required to invalidate a virtual page table entry for the associated virtual storage, must first access the associated GMP using the GMPA in its SD to determine if the interlock is on or off. If the interlock is on, the program requesting the invalidation is not permitted to then make the invalidation, but it must wait until the associated GMP interlock is set to its off state. When the GMP is in off state, the invalidation request to the associated MP virtual storage is allowed after the interlock is set on. The preceeding described subject matter of this invention is implemented in the hardware or microcode of a data processing system. Guest system integrity requires that host programming use the same GMP interlock to prevent invalidations during instruction simulations which depend on guest page table entries.

The selective guest TLB invalidation problem is more difficult for MP guests than UP guests. For example, a MP guest may have two virtual CPUs, in which a first guest program on the first virtual CPU is redispatched to the same first real CPU wherein the first guest program can make use of guest TLB translations retained from its last dispatch on the first CPU. However, a second guest program executing on the secod virtual CPU in that MP guest previously was dispatched on a second real CPU but is now redispatched to a third real CPU on which it cannot make use of any retained guest TLB translations retained in the second real CPU. In this example, the first guest program can use retained guest TLB entries while the second guest program cannot use retained guest TLB entries.

Hence an object of this invention is to guarantee the useability of any existing guest TLB entries in a real CPU on which any guest is being dispatched.

A host TLB translation (address translation for the host program) is always single level, only using one page table which is a host page table. On the other hand, a guest TLB translation (address translation for a guest program) may be single level or double level, the latter using up to three host page tables as well as guest page tables in the guest's virtual storage.

Real main storage allocation in the host system is controlled by the host program and not by any guest program. While a real CPU is in non-emulation mode, the host program can dynamically reallocate real main storage to cause pages of data to be moved to different page frames within real main storage and between real main storage and I/I devices. The page frame real address (PFRA) in a page table entry (PTE) for a relocated page is thereby changed in the related host page tables, which requires the host to first invalidate the PTE before inserting a different PFRA. But while any real CPU is in emulation mode, the guest cannot change any host or other guest page tables, cannot invalidate any host or other guest PTEs, and cannot affect existing host or other guest TLB translations. A guest can affect only the guest's own virtual PTEs, the guest's own translations and the guest's TLB entries, which are only affected by the guest's invalidation of the guest's own virtual page table entries, for which the guest has management responsibility.

Host page table entry (PTE) invalidation by an IPTE instruction makes unreliable all affected guest TLB entries, (i.e. those which address the host page being invalidated). The execution of an IPTE instruction by the host provides the IPTE operand(s) which define a page table entry (PTE) to be invalidated. The PTE entry contains a real page frame address (PFRA) which defines a page frame in real main storage, the translation to which is invalidated by the IPTE instruction. An IPTE instruction invalidates a PTE and any TLB entry in the CPU containing an address translation using this invalidated PTE. An affected guest TLB entry is one which provides the translation of a guest virtual address to a host real address, where the host real address was obtained by a host-virtual to host-real translation which is invalidated by the current host IPTE.

It is another object of this invention to improve the efficiency of handling guest TLB translations in a real CPU while a host program is executing (i.e. non-emulation, that is, not interpretive execution, mode). While any real CPU is not in emulation mode (i.e. in host mode), it is possible for the host program to dynamically reallocate its storage and correspondingly change any host page table entry to potentially make incorrect some affected guest TLB translation in a manner unknown to the guests. The switching between host mode and guest mode may be done at any time on any real CPU in a system.

A "purge guest TLB (PRGT) flat" is provided by this invention for each real CPU in the system to recognize when a host PTE invalidation has made unreliable the affected guest TLB translations in each CPU in the real system. The invention processes the PRGT flag for each CPU in a manner that permits guest TLB translations not to be invalidated while a CPU is in non-emulation mode, so that guest TLB entry invalidation occurs only when each CPU again enters emulation mode. A major advantage for this type of PRGT flag control is to avoid having a CPU in host mode interrupt its operation each time it invalidates a host page table entry in order to invalidate all guest TLB entries in each CPU in the system, which may be a relatively slow process. Thus, the PRGT flag is set for each CPU in the real system whenever the host program invalidates a host PTE, but no guest TLB invalidation is then done. Hence, multiple time consuming guest TLB invalidation operations are avoided for multiple IPTE invalidations at different times while in host mode. Also, guest TLB invalidation may be entirely avoided for a CPU if that CPU does not later go into emulation mode.

BRIEF DESCRIPTION OF THE DRAWINGS

FIG. 5 illustrates the prior art on size and location.

FIGS. 6A through 6E illustrate one embodiment of the invention using purge guest TLB flags, which is considered the preferred embodiments at this time, which are:

FIG. 6A is a flow diagram representing the invocation process for invoking guest operation on a real system.

FIG. 6B is a flow diagram illustrating the process required when a host invalidate page table entry (IPTE) instruction is executed on a real multiprocessor system.

FIG. 6C is a flow diagram of the process of handling a guest IPTE instruction executed on an MP system.

FIG. 6D represents a flow diagram of a multiprocessor guest handling an IPTE instruction on a multiprocessor system.

FIG. 6E is a flow diagram illustrating the processing by other real CPUs in an MP for an IPTE instruction received broadcast.

FIGS. 7A through 7C illustrate an alternative embodiment which does not use the purge guest TLB flags, in which:

FIG. 7A is a flow diagram illustrating the invocation of a guest on a real UP or MP system utilizing the subject invention without having purge guest TLB flags.

FIG. 7B is a flow diagram illustrating the processing for a host IPTE instruction being executed on a real CPU in a multiprocessor system.

FIG. 7C illustrates a flow diagram for other CPUs in a real multiprocessor system for the real CPUs receiving an IPTE broadcast.

FIG. 8 illustrartes a flow diagram for an interlocking process required to coordinate the accessing of the virtual storage of a multiprocessor guest between accesses by any program operating directly for the guest and the host program acting for any guest program on the same multiprocessor guest.

DETAILED DESCRIPTION OF THE EMBODIMENTS

FIGS. 1 through 4 each represent the same example of a hardware configuration for supporting different numbers of guests operating under a host system, such as the VM/XA Migration Aid being marketed by the IBM Corporation. The process invention being in FIGS. 4 through 7 is embodiable in microcode or hardware for use with operating system programming of the VM/XA Migration Aid. FIG. 8 represents a feature of the invention embodiable as software in the operating system.

The hardware shown in FIGS. 1-4 is for a real multiprocessor system (MP) comprised of three CPUs A, B and C, a system controller 11, a main storage 12, and a system area storage 13 which physically may be part of main storage but is only addressable by microcode or hardware; that is, it is not accessible to programs comprised of the user instruction set for a system.

Each state description (SD) is a control block in main storage 12 and is shown in FIGS. 1-4 with a subscript in parenthesis to uniquely indicate each SD provided in main storage. The content of each SD is comprised of a plurality of fields which are described in the introductory portion of the specification. These fields include field MS which defines the origin and extent in storage 12 assigned to the virtual CPU represented by that SD. Also a prefix field is provided in each SD to represent the location in guest main storage 12 that is assigned to a prefix save area (PSA) for the virtual CPU represented by that SD. Also, an invalidate page table entry (IPTE) intercept flag field was previously provided in the SD. In addition to those fields, novel fields are also provided by this invention, which are: a last CPU identifier field (last CPUID), and a guest MP address field (GMPA). The GMPA field is set to zero in FIG. 1 in order to indicate that its SD represents a uniprocessor (UP) virtual system (i.e. UP guest). If the GMPA field is non-zero, its SD represents a virtual CPU in a MP virtual system (i.e. MP guest).

Figure 1:
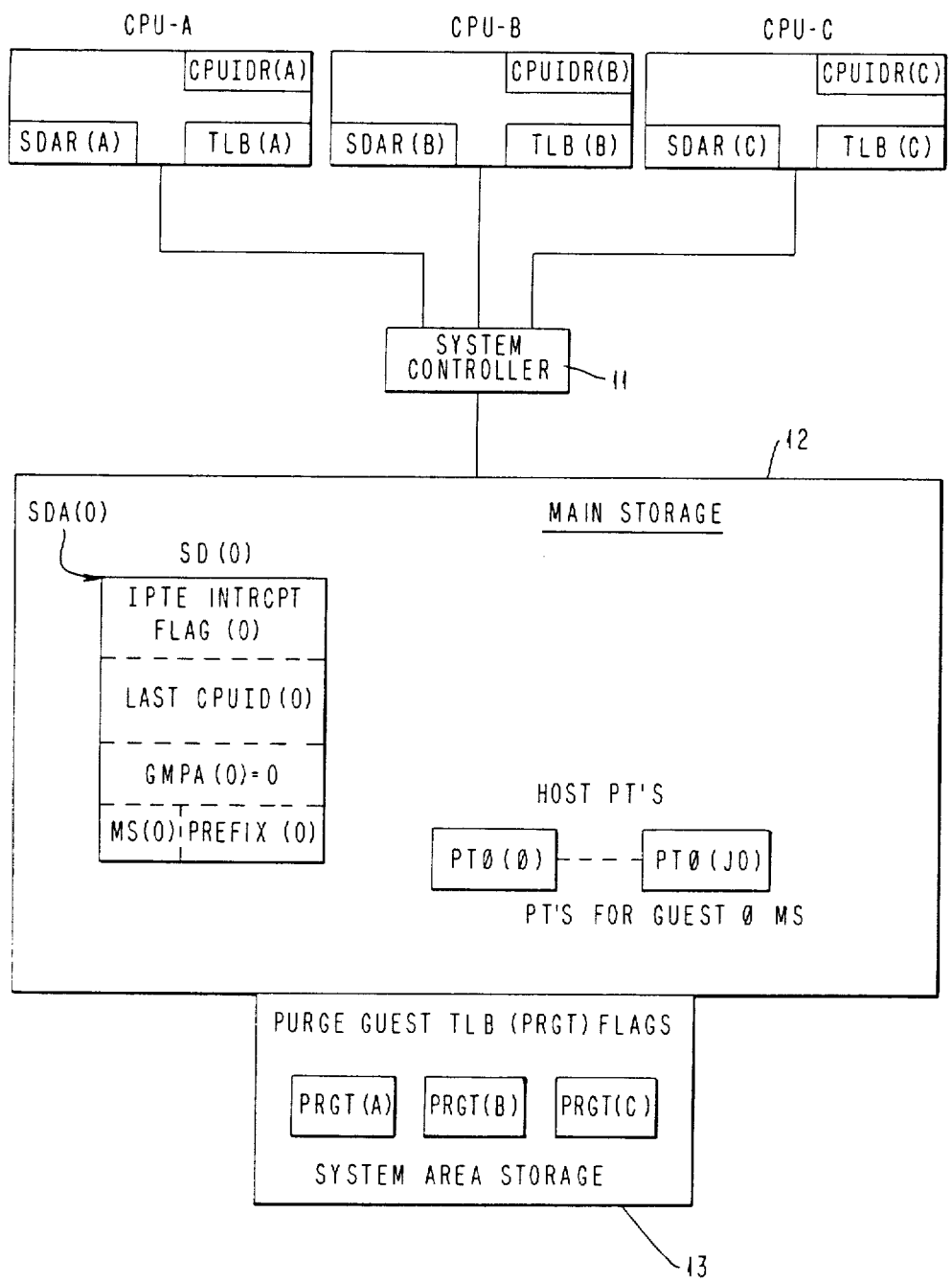
FIG. 1 illustrates a real multi-processor system having a tightly-coupled main storage and a system area storage for supporting a single uniprocessor guest.
Figure 2:
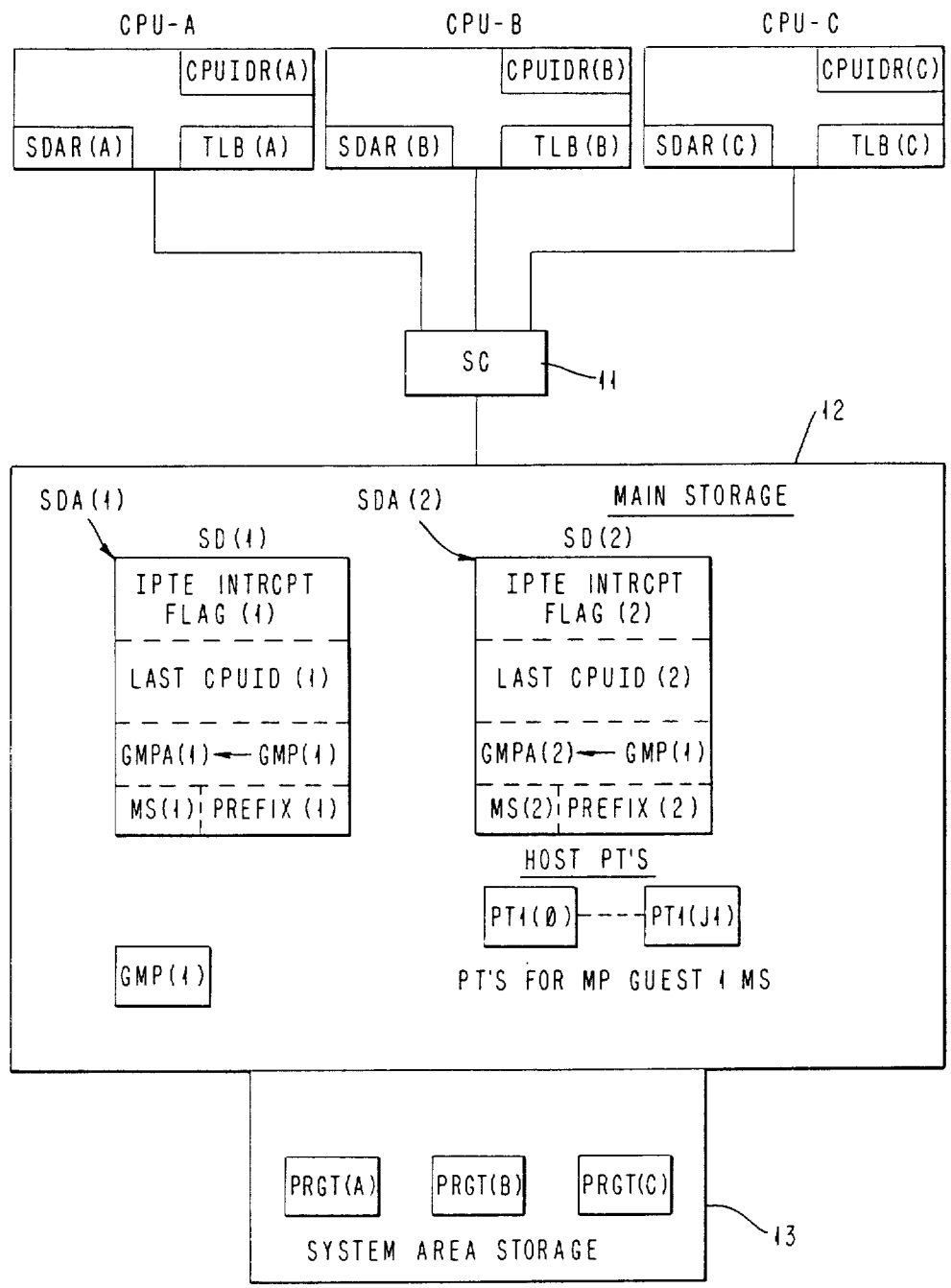
FIG. 2 shows the same real MP system found in FIG. 1 but containing a single MP guest.
Figure 3:
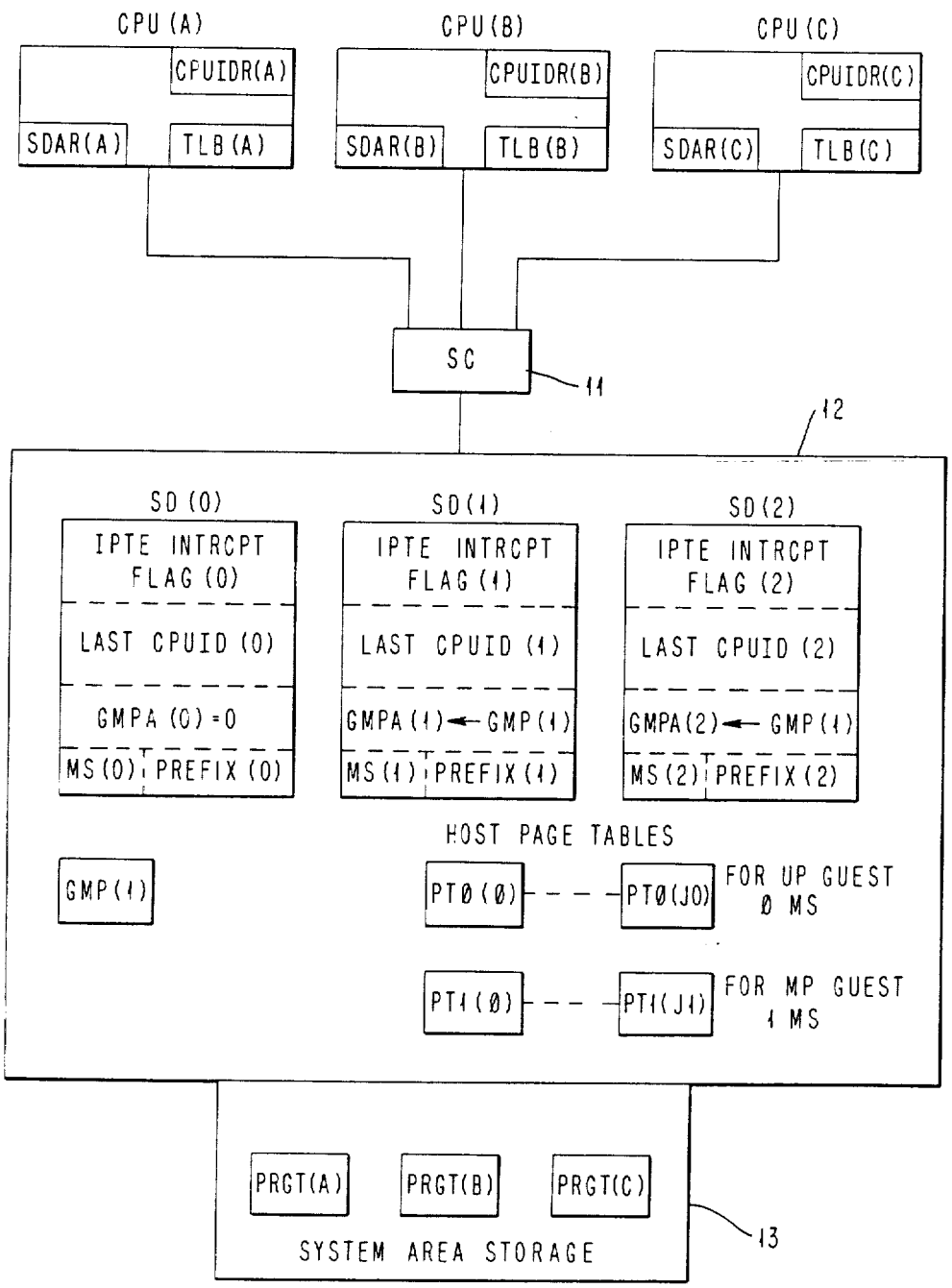
FIG. 3 illustrates the same MP real hardware system shown in FIGS. 1 and 2 but contains a UP guest and a MP guest.
Figure 4:
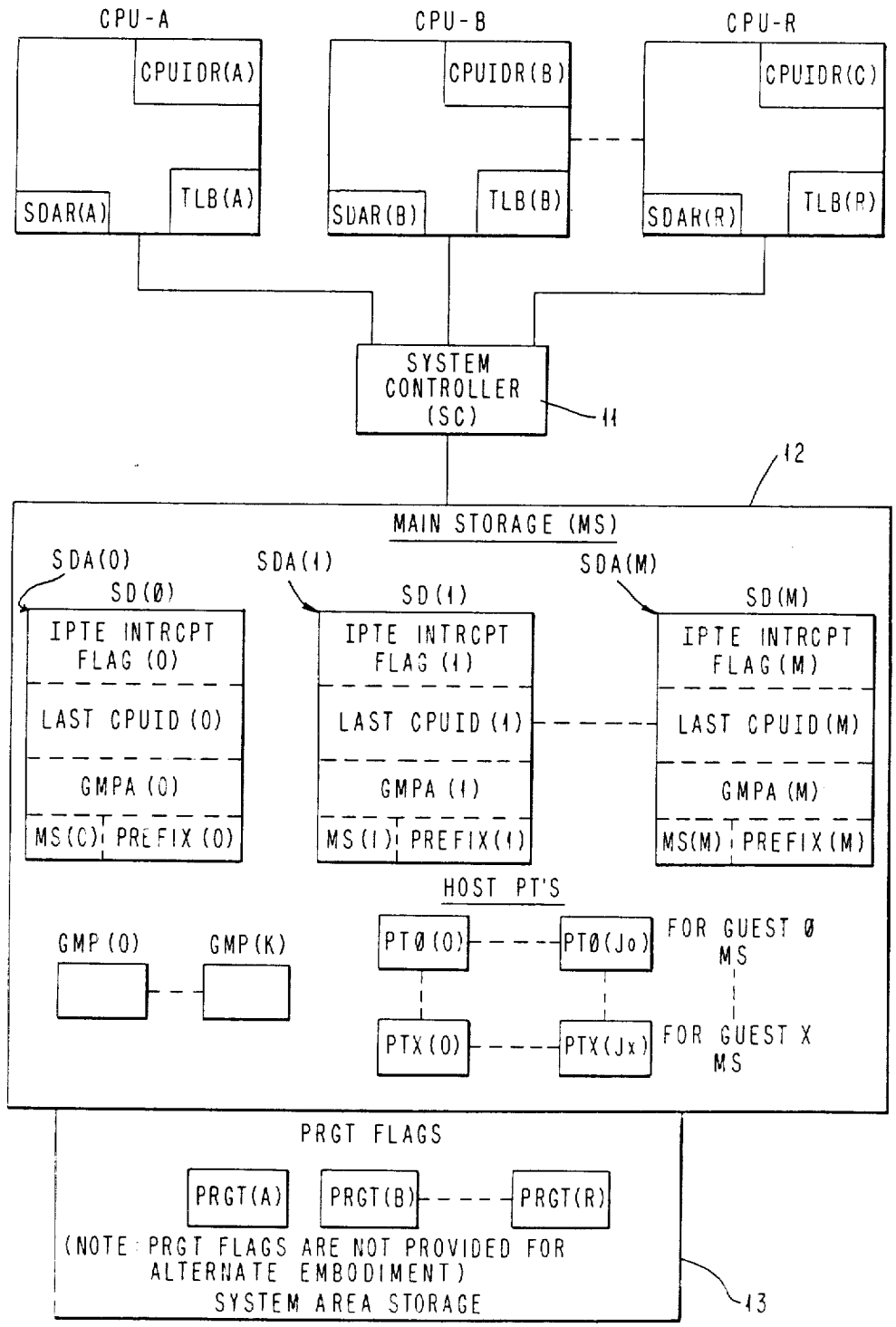
FIG. 4 illustrates the same hardware system shown in FIGS. 1, 2 and 3 but contains any mix of uniprocessor guests and multiprocessor guests.

Hence, a SD may be associated with a uniprocessor (UP) or a multiprocessor (MP) virtual system. FIG. 1 illustrates only the case of a uniprocessor guest. FIG. 2 illustrates only the case of a single multiprocessor guest. FIG. 3 illustrates the case of the UP guest and MP guest being in the same real MP system. FIG. 4 shows the general case with any number of UP and/or MP guests in the same real MP system.

Also in main storage 12 of FIGS. 1-4 are host page tables (PTs). For example, PT0(0) through PT0 (J0) are a set of page tables for UP guest 0 main store (MS). Each host page table is referenced by an entry in a host segment table (not shown) of conventional type. The host page tables for a guest map the extent of real main storage represented in the MS field in each SD for a guest. That is, the host page tables translate a guest real address into a host real address in real main storage 12. If a guest uses virtual addressing, a set of guest page tables is also needed to translate each guest virtual address into a guest real address, which provides a second level of address translation for a guest.

In FIG. 2, a single MP guest is represented by the two state descriptions, SD(1) and SD(2). The form of SD(1) and SD(2) is the same as described for SD(0). An SD address (SDA) indicates the location of a respective SD. Thus SDA(1) locates the beginning of SD(1), and SDA(2) locates the beginning of SDA(2) in real main storage 12.

The main storage fields MS(1) and MS(2) in the SD's representing the MP guests in FIGS. 2 and 3 are set to the same origin and extent values to represent the tightly-coupled main storage for the respective MP guest. A single set of host page tables PT1(0) through PT1(J1) are provided for this respective MP guest. Each of the SDs for the MP represents a respective virtual CPU in the respective MP.

An MP interlock field, called a guest MP field (GMP), is provided for each MP guest. Thus, in FIG. 2, GMP(1) is the interlock field provided for the virtual MP system represented in FIG. 2 as the single MP guest.

All of the SDs for a MP guest have their GMPA fields set to the same common value, which is the address of the GMP interlock field associated with that respective MP guest. Thus, in FIG. 2, the respective MP guest has SD(1) and SD(2), each having a GMPA field set to the same address pointing to GMP(1). That is, GMPA(1) is set to the address of GMP(1), and GMPA(2) is also set to the address of GMP(1).

FIG. 3 illustrates real main storage 12 containing both the UP guest of FIG. 1, and the MP guest of FIG. 2. Thus, SD(0) is as described for the UP guest in FIG. 1, and SD(1) and SD(2) are as described for the MP guest in FIG. 2 with its respective interlock field GMP(1).

Also in main storage 12 of FIG. 3, the host page tables for the UP guest 0 and for the MP guest 1 are respectively the same as previously described for FIGS. 1 and 2.

FIG. 4 illustrates real main storage 12 generalized to contain any number of guests represented by any number of SDs which are shown as SD(0) through SD(M). The SDs may be arranged in any combination of UP and MP guests, with any MP guest having any number of SDs. Also, each MP guest will have a respective GMP interlock field from the set GMP(0) through GMP(K) for K number of MP guests in the real system. Also in FIG. 4 there is one set of host page tables per guest to provide X number of sets of host page tables for X number of guests in any mix of UP and MP guests mapped into real storage 12.

FIGS. 1 through 4 each show CPU-A, CPU-B and CPU-C. Each of these CPUs is required by this invention to have certain unique registers which are illustrated as a state description address register (SDAR), a CPU identifier register (CPUID), and a translation lookaside buffer (TLB). These registers shown in each of these CPUs subscripted by a CPU designator A, B, or C to represent the respective CPU in which they are located.

The CPUID contains a permanent unique identifier for the respective CPU in the real MP system. This value does not change within a respective CPU in the system.

The TLBs of a respective CPU are as described in the previously cited U.S. Pat. No. 4,456,954.

The SDAR in each CPU contains a value which is the SDA address to the last SD to be used by that respective CPU. For example, if CPU-B is executing a program for the UP guest in FIG. 1, then the SDAR in CPU-B will be set to the address SDA(0) for locating SD(0).

Also, in each of the FIGS. 1 through 4, there is provided in system area storage 13, a respective flag field for each of the respective CPUs in the real system. These flags are called purge guest TLB (PRGT) flags. They are subscripted with the letter for the respective real CPU they represent.

All PRGT flags are set on whenever the host program executing in any CPU invalidates any host page table entry. As soon as any guest program is to be dispatched on any CPU, the state of the PRGT flag for the CPU is tested, and if it is found on, affected TLB entries in that CPU are invalidated. Then that PRG flag is set to its off state without affecting the state of any other PRGT flag.

The preferred embodiment of the invention contains a PRGT flag for each of the CPUs in a real MP, as shown in FIGS. 1 through 4. FIGS. 6A through 6E illustrate the preferred embodiment of the invention which uses the PRGT flags.

However, an alternate embodiment of the invention is also described herein which does not use any PRGT flags. FIGS. 7A, B, and C illustrate the alternate embodiment of the invention which does not use the PRGT flags.

The start interpretative execution (SIE) instruction is described in prior cited USA application Ser. No. 273,532 (PO9-80-005) for providing guest emulation on a real CPU. In summary, a host program (such as a machine hypervisor type of program) may execute a SIE instruction each time the host program is to initiate a guest on the same CPU on which the host program is then executing. The SIE instruction has a single operand which is the address of a state description (SD) in the real main storage of the system. The execution of the SIE instruction causes fields in the addressed SD to be accessed in main storage and stored into the CPU in order to put the CPU in an emulation state represented by the values in the fields of that SD.

FIG. 5 illustrates the prior art methodology for purging the TLBs of a CPU upon the CPU executing a SIE instruction. Thus, step 21 of FIG. 5 represents the initiation of execution of a SIE instruction on a real CPU. Step 22 follows by purging at least all guest entries (but preferably no host entries) from the TLB of this CPU. Then after the SIE instruction is invoked, step 23 causes the guest program to be executed on this CPU in emulation mode.

Figure 6C:
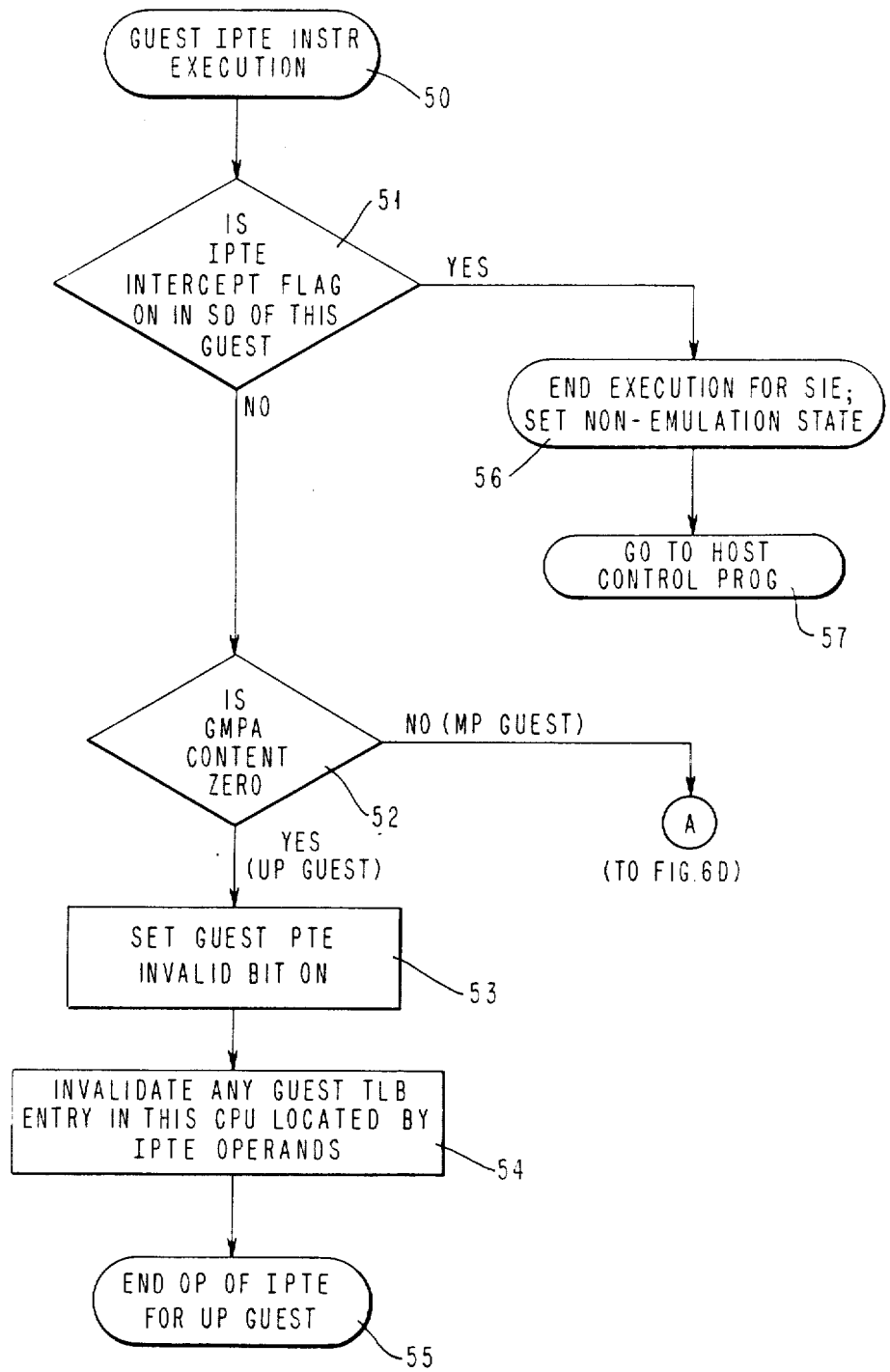

FIGS. 6A through 6E represent the preferred process for the subject invention. FIG. 6A illustrates an inventive method for SIE instruction invocation. Step 30 includes loading all of the pertinent fields from the SD which is addressed by the respective SIE instruction into the real CPU on which the SIE instruction is executing. Then step 31 tests the state of the PRGT (purge guest TLB) flag in system area 13 for the respective CPU on which the SIE instruction is executing. If the PRGT flag is off, then step 31 takes its no exit to step 32. Step 32 accesses the operand address in the current SIE instruction (represented in FIG. 6A as SDA(SIE)), and the SDAR content in this CPU indicating the last SD accessed by this CPU. Step 32 compares SDA(SIE) to the content of this SDAR register in the CPU which is executing the SIE instruction. If step 32 finds SDA(SIE) equal to the SDAR content, this equality indicates that the last SD to have been used by this CPU is the same as the current SD being accessed by the current SIE instruction on this CPU. The step 33 is entered.

In step 33, the CPU identifier for this CPU is read from its CPUIDR register and compared with the content of the last CPUID field within the SD currently being accessed, which is represented as the CPUID(SD). Each CPUID field identifies the last CPU to use the SD having that CPUID field. If step 33 finds the CPUIDR content equal to the CPUID(SD) content, then this CPU (on which the current SIE instruction is being invoked) is the last CPU in the MP on which this SD was dispatched.

Accordingly, steps 32 and 33 determine if the SD being accessed by the current SIE instruction on a given CPU is: (1) the last SD to be executed on this CPU (step 32), and (2) that this SD did not execute on any other CPU during the interim when it was not executing on this CPU.

Step 38 is directly entered when steps 32 and 33 both find equality during their operation. Step 38 sets this real CPU to emulation state. Step 38 may involve setting on an emulation state trigger in the respective CPU. Then step 39 is entered to begin executing the guest program being dispatched on this CPU. The guest program is located by an address in the PSW of the CPU which is one of the prior art fields loaded from the SD being accessed.

However in FIG. 6A, it is possible when step 31 is executed, that the PRGT flag for this CPU will be in an on state in system area 13 (see FIGS. 1-4). Then the yes exit is taken from step 31 to step 34 which purges (i.e. invalidates) all guest entries in the TLB of this CPU. This may be done by setting on an invalidation bit in each TLB entry having a guest bit in an on state.

Then step 35 is entered which stores the CPU address (i.e. content of CPUIDR of this CPU) into the last CPA field in the SD addressed by this SIE instruction.

Then step 36 resets this PRGT flag for this CPU to an off state, which is the same PRGT field that was tested by step 31. Step 37 is entered which then sets the content of the SDAR register in this CPU with the operand address in the current SIE instruction, i.e. SDA(SIE). Then step 38 is entered, followed by step 39, as previously explained.

However, if step 32 is entered and finds inequality between the operand address of the current SIE instruction and the last SD address used by the current CPU (i.e. the SDAR content), then step 34 is entereed in which the sequence of steps 34, 35, 36, 37, 38 and 39 are executed in the manner previously described.

On the other hand, if step 33 is entered and finds inequality between the CPU identifier in CPUIDR and the last CPUID field, CPUID(SD), then the unequal exit is taken from step 33 to step 34, and steps 34 through 39 are executed in the manner previously explained.

In addition, a CPU identifier in CPUID(SD) of all ones can be set aside as not being assignable to any real CPU. The all one values may then be used by host programming to cause SIE invocation to purge all TLB entries for this guest. At the next SIE invocation using this SD, the all ones CPUID)SD) value then causes a non-equal comparison between any CPUIDR and CPUID(SD) in step 33. The all ones CPUID(SD) will be replaced by the actual CPUIDR in step 35 of FIG. 6A during the next SIE invocation.

During a guest program execution, the guest program may come to a point where it may need the assistance of the host control program, such as when the guest is trying to execute a type of privileged instruction which guests are not permitted to execute. This may cause the CPU to set on an intercept field in the SD being used by the guest. An interception of the guest program is then done and control is returned to the host program.

Whenever a guest program is either intercepted or interrupted, the guest program is discontinued, and the real CPU invokes the host program.

A terminated guest may be later dispatched on the same CPU or a different CPU in the real MP system to continue its processing. Each time a guest is dispatched on any CPU, SIE is again executed by the host program, and the invocation method in FIG. 6A is done.

When a guest program is executing on a real CPU in emulation mode, the guest program may invalidate a page table entry (PTE) in one of the guest page tables. (Note that a guest page table is not one of the host page tables shown in FIGS. 1 through 4. Guest page tables are used only by guests using virtual addressing). Hence, while the host program is executing, it may invalidate a host page table (i.e. one of the page tables shown in FIGS. 1-4). While a guest program is executing, it may invalidate only guest page table entries, but not host page table entries. Invalidation of a page table entry is commonly done by a program executing a privileged invalidate page table entry instruction (IPTE). Either the host or a guest program executing on any CPU may contain IPTE instructions.

FIG. 6B illustrates the methodology of this invention for the execution of a host IPTE instruction. FIGS. 6C and D illustrate the methodology of this invention for the execution of a guest IPTE instruction by either a UP guest or a MP guest. FIG. 6E illustrates the methodology of this invention regarding the reaction of other real CPUs on a real MP system when an IPTE instruction is executed on any CPU in the MP, whether it be by the host program or by any MP guest program. FIG. 6E is not used by an IPTE instruction executed by a UP guest program.

In FIG. 6B, a host program executing an IPTE instruction executes step 40 by accessing the page table entry identified by the operands in the IPTE instruction. Then step 41 sets on an invalid bit in this page table entry. Step 42 invalidates any TLB entry in this CPU which contains an address translation using the page table entry of the IPTE instruction being executed by setting on the TLB entry's invalid bit to its invalid state. Step 43 sets on all PRGT flags for all CPUs in the system area storage 13 shown in any FIGS. 1-4. Without the PRGT flags in step 43, the prior art technique of FIG. 5 would cause the host to perform a purging of at least all guest entries, and perhaps to purge all host TLB entries also, for each execution of an IPTE instruction. It is possible during a dispatch of the host program that the host may execute a large number of IPTE instructions, such as for main storage allocation procedures performed by the host program. The process of purging guest TLB entries may be a slow process which causes a pause in the host program execution to perform this function, which slows down the host program operation. Step 43 eliminates the need for such pauses in host program operation, and thereby correspondingly improves performance of the host program. Thus, the PRGT flags allow a single invocation of the SIE instruction to do the purging for an accumulation of IPTE requests received during host execution. Also, it allows host programming which does not use the SIE instruction but uses the IPTE instruction to suffer no performance degradation for purging guest TLB entries.

Step 44 causes the CPU executing a host IPTE instruction to broadcast signals to each of the other CPUs in the real MP. The broadcast signals 45 in FIG. 6B represent the operands of the IPTE instruction, and the content of the CPUIDR register in the broadcasting CPU to identify it.

It is presumed in this embodiment that the real CPUs in the real MP are asynchronously executing programs with respect to each other. Each CPU receiving a broadcast is: (1) allowed to complete the instruction it is currently executing, (2) performs invalidation of affected TLB entries, and (3) provides response signals 77 to the IPTE broadcasting CPU. This process on the receiving CPU is shown in FIG. 6E. In FIG. 6B, step 47 determines for the broadcasting CPU when all CPUs receiving the broadcast have responded. Then step 48 completes the operation for the host IPTE instruction.

FIGS. 6C and D provide for the execution of a guest IPTE instruction. The guest IPTE process in FIGS. 6C and 6D may be used for both the embodiment described in FIGS. 6A-6E and the embodiment described in FIGS. 7A-7C, because FIGS. 6C and 6D do not use the PRGT flags. The invocation process in FIG. 6A, the host IPTE process in FIG. 6B and the responding CPU process in FIG. 6E can only be used in the preferred embodiment because they are directly or indirectly dependent on the use of the PRGT flags which are only used by the preferred embodiment.

In FIG. 6C, step 50 begins the execution of a guest IPTE instruction. Step 51 is entered to check the status of the IPTE intercept flag field in the SD of this guest; this is the SD being addressed by the currently invoked SIE instruction on this CPU. The IPTE intercept flag in the SD existed prior to this invention, and it was tested whenever a guest tried to execute an IPTE instruction. When the IPTE intercept flag is set on, the guest program is discontinued and control is passed to the host program to simulate the execution of the IPTE instruction for the guest. If such interception is to be done, an exit is taken from step 51 to step 56 to terminate execution of the current SIE instruction by the CPU and set the CPU into its non-emulation state. Then step 57 is entered for the CPU to pass control to the host control program.

This invention is invoked if step 51 finds that the IPTE intercept flag is off while a guest IPTE instruction is being executed. Then step 52 is entered to examine the content of the guest MP address field (GMPA) in the SD being accessed by the current SIE instruction. If the GMPA content is zero, then a UP guest is indicated as being represented by the subject SD.

On the other hand, if the GMPA content is not zero, then the no exit is taken from step 52 because it indicates that the current SD represents a virtual CPU in a virtual MP system. Then FIG. 6D is entered for processing a IPTE instruction being executed by a MP guest on one of the virtual CPUs of the guest represented by the currently addressed SD.

In FIG. 6C when the GMPA content is zero to indicate a U guest, the yes exit from step 52 is taken to step 53 which invalidates the guest page table entry which is being addressed by the UP guest's IPTE instruction. Invalidation is done by step 53 setting on the invalid bit in the addressed guest PTE. Step 54 also invalidates any guest TLB in this CPU having a translation using the invalidated PTE.

Then step 55 is entered to complete the operation for this IPTE instruction for a UP guest.

If step 52 indicatees that the SD being accessed represents a virtual CPU of a MP guest, then exit A is taken to FIG. 6D where step 58 is entered to test the state of the interlock field GMP being addressed by the non-zero content of the GMPA field in the current SD being accessed. The GMP interlock controls access to the MP guest's page table entries. If this GMP interlock is set to an on state (indicated by a 1 in box 58) invalidation of the MP guest page table entries is inhibited. Then step 69A is entered to end execution for the current SIE instruction and to set the CPU to non-emulation state. Then step 69B is entered which causes the CPU to invoke the host control program to start its execution, which may dispatch the CPU to another guest while the terminated MP guest is waiting for the interloeck to be reset off. The reason why the CPU may be dispatched to another guest is because there are times when the interlock may be on for a relatively long time during which it is more efficient to have the CPU execute for another guest, instead of having the real CPU wait with the interlocked guest program until the interlock is set off resulting in the real CPU being tied up in a non-productive manner for a relatively lengthy period of time.

However, step 58 may find that the GMP field is in an off state (set to 0) in which case step 59 will be immediately entered to set the GMP bit to a 1 state, which sets the interlock on to thereafter prevent any other virtual CPU or the host from accessing this MP guest's main storage until this GMP interlock field is set to an off state (i.e. zero state). Testing and setting the GMP field is done with a hardware interlocked update operation like a System/370 compare and swap instruction.

Then step 61 set on the invalid bit for the guest page table entry which is being addressed by the current guest IPTE instruction. Step 62 invalidates any guest TLB entry in this CPU which is located by the operands of the current guest IPTE instruction, which TLB entry would have used the guest PTE invalidated by step 61.

Step 63 broadcasts IPTE signals 64 to the other real CPUs in the real MP system. The broadcast signals identify the broadcasting CPU and indicate the IPTE operands to the other CPUs in the preferred embodiment. For the alternative embodiment in FIGS. 7A–C, the broadcast signals 64 also indicate that this IPTE instruction is being executed for a MP guest. Responding IPTE signals 77 are received from each of the receiving CPUs. Step 66 indicates by its yes exit when all other CPUs have responded. Step 67 then resets this GMP field to an off state (indicated by zero), and step 68 completes the operation for this MP guest IPTE instruction.

FIG. 6E represents the process by which each of the other real CPUs in a real MP responds to a CPU providing an IPTE broadcast. The received broadcast signals set an interrupt trap in each receiving CPU which does not stop the receiving CPU from completing whatever operation it is then doing. The broadcast signals may have been sent by a CPU executing a host IPTE instruction such as broadcast 45 from FIG. 6B, or from a CPU executing an MP guest IPTE instruction such as broadcast signal 64 from FIG. 6D. For the purposes of the embodiment in FIG. 6E, the broadcast need not indicate whether it is for a host IPTE or a MP guest IPTE.

When the interrupt trap is set, step 27 senses an end operation signal for the microcode or hardware executing the current instruction or operation executing in the receiving CPU. Then step 73 is executed by the CPU to cause an invalidation of any TLB entry therein located by the broadcast IPTE operand signals trapped in the receiving CPU. Thus step 73 will invalidate any guest or host TLB entry located by the trapped IPTE operand representation.

Step 74 tests whether the receiving CPU is in emulation state. If the receiving CPU is not in emulation state, it is executing the host program, and the no exit is taken from step 74 directly from step 76. Then no guest TLB entries are invalidated at that time.

On the other hand if step 74 finds that the receiving CPU is in emulation state, its yes exit is taken to step 75 which purges all affected guest TLB entries (i.e. those which address the host page being invalidated) in the receiving CPU.

Then in step 76 the receiving CPU sends response signals 77 to the broadcasting CPU to indicate that the response processing is completed by the receiving CPU for the broadcast IPTE signals. Then step 78 is entered wherein the receiving CPU executes its next instruction which follows the instruction or operation having an end operation in step 72.

It will be noted in FIG. 6C that there was no broadcast operation for an UP guest IPTE instruction, due to the operation of this invention. The reason why such UP guest broadcast is made unnecessary is because of the novel SIE instruction execution invocation process in FIG. 6A. It assures that if a SD did, during an interim period execute on a second CPU and left guest TLB entries valid in the first CPU, that the first CPU when attempting to run with a different SD would not be able to utilize those guest TLB entries, because step 32 during the SIE instruction invocation for any guest on the first CPU which would find a non-equal condition for the next guest's SD address causing an exit to step 34 that would purge all of the guest entries on that CPU. The same thing happens if the first SD is later dispatched on the first CPU, because the CPUID compare at step 33 causes an exit to step 34.

It is harmless to leave such valid guest TLB entries on the first CPU when they will be purged by another guest being dispatched on the first CPU. If the host program is next dispatched on the first CPU, the affected guest TLB entries will not be purged but may be purged out of the TLB as the host program needs the space in the entries for its address translations.

Accordingly in a real MP system that only supports UP guests, the only reason for broadcasting would be to support host IPTE instruction execution.

This invention allows reuseability of existing guest TLB entries by either a UP or MP guest program during its next redispatch on the same CPU on which it was last dispatched. The TLB entries in each CPU are flagged as guest or host address translations, and both guest and host entries may exist simultaneously with their distinguishing flag bits.

Hence, guest TLB entry reuseability is available to a guest program executing on either a UP guest CPU or a MP guest CPU. The guest TLB entry reuseability condition exists when equality is determined by both steps 32 and 33 in FIG. 6A.

Existing guest TLB entries on a CPU are not useable by a redispatched guest program, if during the interim period, the CPU was dispatched to another guest program, because then the redispatched guest program would not know if the existing guest TLB entries are for this guest program or for the interim dispatched guest program. This non-reuseable condition is determined by inequality for step 32 in FIG. 6A.

Also existing guest TLB entries are not reuseable by a redispatched guest program on a first CPU if during the interim period this guest was dispatched on a second CPU. This is because a guest IPTE or PTLB operation may have occurred on the second CPU which did not affect guest TLB entries on the first CPU. This non-reuseable condition is determined by inequality for step 33 in FIG. 6A.

Each selective TLB invalidation step 42, 54, 62, 73, 142, 173 or 182 in any embodiment may be performed with a small amount of overkill (excess TLB invalidations) when there is an adequate hardware simplification tradeoff. For example, when the TLB hardware is designed to be set-associative having plural entries (commonly two entries) in each congruence class of the TLB, step 42, etc. may invalidate all entries in the congruence class located by the IPTE operands. This results possibly in several extra TLB entries being invalidated which might be either a host or guest TLB entry. This overkill still leaves all other existing TLB entries for subsequent use by programs.

FIGS. 7A, B and C illustrate an alternative method embodiment to that described for FIGS. 6A through E and also is implemented in the microcode or hardware of each CPU in the MP. The basic difference in these embodiments is that the embodiment in FIGS. 7A-C does not use the PRGT flag fields (and such flags need not exist. Another difference is the FIGS. 7 embodiment use a broadcast signal which distinguishes between a sending host IPTE and a sending MP guest IPTE. Each of the processes in FIGS. 6A-E are unique to the first embodiment, except for the guest IPTE instruction process in FIGS. 6C and D which also has a dual use in the second embodiment.

The method steps in FIG. 7A are similar to corresponding steps in FIG. 6A and have the same reference numbers prefixed with the digit 1. However, steps 31 and 36 in FIG. 6A do not have any corresponding steps in FIG. 7A and are skipped in the FIG. 7A process. Otherwise, the process in FIG. 7A operates like the process described in FIG. 6A to provide the assurance to any guest program invoked by the method in FIG. 7A that it can use any guest TLB entries that exist after the process in FIG. 7A has completed its operations.

FIG. 7B illustrates the execution for a host IPTE instruction in the second embodiment. However, the execution for the guest IPTE instruction in the same embodiment is the same as defined for the first embodiment in FIGS. 6C and D which is hence included by reference in the second embodiment of FIGS. 7A-C.

In FIG. 7B, a host IPTE instruction execution begins at step 140. Step 141 invalidates the host page table entry (PTE) identified by the subject host IPTE instruction by setting the invalid bit on in that host PTE. Step 142 invalidates any corresponding host TLB entry in this CPU containing a translation utilizing the host PTE invalidated by step 141. Any corresponding host TLB entry is located by step 142 with the operands of the subject IPTE instruction.

Then, step 149 invalidates all affected guest TLB entries on this CPU. Then step 144 broadcasts signals to the other real CPUs in the real MP for the subject host IPTE instruction indicating that a host IPTE is being executed and presenting the IPTE operands, so that each other real CPU can invalidate any affected guest TLB entries.

Step 147 indicates when all responses 177 from other real CPUs have been sent to the broadcasting CPU by each other real CPU in the MP that executed the process illustrated in FIG. 7C. Then step 148 completes the operation for the subject host PTE instruction, after which the host program can go to its next operation.

FIG. 7C performs the IPTE response to the broadcasting CPU analogously to FIG. 6E for the first embodiment. Thus, those steps in FIG. 7C that are equivalent to those in FIG. 6E carry the same reference number with a prefixed one digit in FIG. 7C. Thus in FIG. 7C, step 171 causes an interrupt trap to be set in the receiving CPU by the received broadcast IPTE signals. The broadcast signals provided to the interrupt trap of step 171 in FIG. 7C include a guest or host signal indicating whether the broadcast is for a MP guest IPTE instruction from FIG. 6D, or for a host IPTE instruction from FIG. 7B. This indication can be held by a single bit in the receiving CPU as part of its interrupt trapping operation. This is unlike the operation for the first embodiment which does not need the broadcasting CPU to signal whether its IPTE instruction is for a MP guest or a host, since that information is not used by any receiving CPU in FIG. 6E.

In response to the setting of the IPTE interrupt trap by step 171, the receiving CPU executes step 172 to sense its next end operation and perform a microcode or hardware branch to step 181 to execute the method of the subject invention shown in FIG. 7C, instead of having the receiving CPU directly go to its next instruction. Step 181 tests whether a host or MP guest signal was stored by the interrupt trap of step 171. This guest or host signal is used in FIG. 7C to determine whether to perform a selective invalidation of a guest TLB entry, or to purge all of the affected guest entries from the TLB in the receiving CPU.

If step 181 determines that the trapped signal is for a MP guest IPTE broadcast, then step 182 is entered to selectively invalidate any affected guest TLB entry specified by the broadcast signal.

On the other hand, if step 181 finds that the trap indicates a broadcast host IPTE signal, then step 183 determines if there are any guest TLB entries in the TLB of the receiving CPU, and if any affected guest TLB entries are found step 184 is entered to purge all of the affected guest TLB entries. Then step 173 is entered to selectively invalidate any host TLB entry in the receiving CPU which is located by the broadcast host IPTE operands trapped by step 171.

Then step 176 sends a signal 177 back to the IPTE broadcasting CPU that processing is completed on the receiving CPU for the broadcast IPTE instruction. The trap of step 171 (like the trap of step 71) also recorded the CPUID of the broadcasting CPU from the broadcasting process in FIG. 6E for a broadcasting MP guest or from FIG. 7B for a broadcasting host IPTE. This responding signal 177 is therefore sent to the broadcasting CPU by step 176 to complete the responding IPTE operation by the receiving CPU.

Then step 178 is entered by the responding CPU in order to execute the next instruction which would have been entered after step 172 if the intervention for an IPTE broadcast had not taken place.

Accordingly, the embodiment in FIGS. 7A-C retains the advantage of the embodiment in FIGS. 6A-E by allowing guest TLB entries to be carried over from the last dispatch of a SIE instruction to the next dispatch of the same SIE instruction on the same CPU without invalidating the guest TLB entries existing from the last dispatch. An advantage of the embodiment in FIGS. 6A-E (which is not found with the embodiment in FIGS. 7A-C) is that only the latter embodiment will interrupt CPU operation on every real CPU in a real MP to invalidate affected guest entries in the real MP each time any CPU executes a host IPTE instruction. The latter disadvantage is avoided in the embodiment of FIGS. 6A-E by using PRGT flags for all CPUs which eliminate guest TLB invalidation operations for all host IPTE operations while any CPU is executing the host program (i.e. in non-emulation state). The PRGT flag operations cause the effect of all host IPTE instruction executions (regardless of their number) to accumulate in relation to the next dispatch of any guest, so that the real CPU can perform a single purge of all guest TLB entries during SIE invocation to accommodate all prior host IPTE instruction executions. The accumulated postponement of guest TLB invalidations for all prior host IPTE instruction executions results in a significant performance improvement for the real MP system. On system hardware supporting the SIE instruction, host programs not using the SIE instruction do not incur the overhead of purging guest TLB entries.

FIG. 8 illustrates operations by a host program while it is simulating an instruction (which is not an IPTE instruction) for a guest. That is, the instruction is in a guest program on a virtual CPU, and it was found not be an instruction of the type that should be executed within the interpretive execution. An interception of such instructions is done, by returning control to the host program where the instruction can be simulated. (Simulation of guest instructions by a host program is well known in the art of hypervisor programming, such as in the programming for VM/370 type programs by IBM and others found in the commercial marketplace for many years.)

During simulation of a guest instruction by the host program for step 200, step 201 is entered in order to invoke the subject matter of this invention. Step 201 tests the field GMPA in the SD currently representing the virtual CPU being used by the guest program containing the instruction being simulated to determine if the SD represents a virtual CPU in a UP guest or MP guest. If the GMPA field is found to be in a non-zero state, it represents a virtual CPU in a MP guest, and step 202 is entered to access and test the GMP interlock field addressed by the GMPA tested in step 201. If the GMP field is set to a 1 state, it indicates that an interlock is on for another virtual CPU in this MP guest. The interlock prevents all other virtual CPUs in a MP guest, except the virtual CPU causing the interlock to be set on, from invalidating any page table entry (PTE) of the MP guest. That is, when the GMP interlock is on, PTE invalidations are prevented by or for every other virtual CPU in the MP guest, including by another virtual CPU of the MP guest or by host simulation software acting for another virtual CPU of that MP guest. If the GMP field is found in a 1 state, step 203 resolves the interlock by conventional wait/post or spinning software locking techniques. When step 202 finds the GMP field in a zero state, the no exit is taken to step 204 which sets on the GMP field to a 1 state to set on the interlock for this program simulation so as to prevent any instruction by other virtual CPU or its host program simulation from invalidating an MP guest PTE.

On the other hand, if step 201 finds that the GMPA field is set to zero, then the instruction being simulated is for a UP guest, in which case there is no GMP to be tested and accordingly step 205 is directly entered, thereby avoiding the operations represented by steps 202, 203 and 204.

Then step 205 is entered by the host simulation program to translate by software the operand address(es) of the guest instruction being simulated, utilizing the guest segment table and a guest page table. After the translation is completed by step 205, step 206 is software which uses the translated addresses(es) to perform the fetch or store of the operand data in the MP guest main storage as required by the instruction being simulated.

Then step 207 retests the GMPA field in the pertinent SD to again determine if this simulation is for a UP guest or MP guest. If GMPA is non-zero, the simulation is for a MP guest and step 208 is entered. If GMPA is zero, the simulation is for a UP guest and step 209 is entered.

For a MP guest, step 208 sets off the GMP interlock field by setting it to zero. Step 209 is entered to continue the operation of the host control program simulation process which was invoked by step 200.

The described embodiments presume that the TLBs are only capable of holding entries for one guest at a time. However, the TLBs may have a guest identifier included with each guest TLB entry to associate a particular TLB entry with a particular guest. In this way, plural guests may simultaneously have respective TLB entries in a real CPU. Then the process of either embodiment can be operated by directing its operation at any time to the entries for a particular guest's IPTE or host IPTE. The invalidation for a particular guest IPTE will invalidate only TLB entries for that particular guest in all CPUs in a real MP system without necessarily affecting the TLB entries for any other guest. The invalidation for a host IPTE is on all guest TLB entries without considering the guest TLB identifier.

While the invention has been particularly shown and described with plural embodiments thereof, it will be understood by those skilled in the art that various changes in form and details may be made theerein without departing from the spirit and scope of the invention.

Having thus described our invention, what we claim as new, and desire to secure by Letters Patent is:

1. A method for handling address translations made by a virtual system (guest) emulated on a real uniprocessor (UP) data processing system having a real CPU and a real main storage, guest address translations being put into guest identified entries (guest TLB entries) in a translation lookaside buffer (TLB) of the real CPU while the CPU is in emulation state, the method comprising:

providing a state description control block (SD) in the real main storage for defining each virtual CPU in the data processing system, defining a unique SD identifier (SDI) for each SD in the system, also providing at least one SD identifier field (SDAR) for the real CPU to contain an identifier (SDI) to a previous SD used by this CPU, setting the SDAR for the real CPU to the SD identifier (SDI) of the SD for each guest dispatched on the real CPU, comparing the content of a previous SDI entered in the SDAR of the real CPU with the SDI of a next guest on the real CPU, not invalidating any guest TLB entry in the CPU if the comparing operation finds the SDI of the next guest is equal to the SDI in the SDAR for the real CPU, so that existing guest TLB entries are allowed to be used by the guest for a guest program, but invalidating the existing guest TLB entries if inequality is found by the comparing operation.

2. A method for handling address translations made by a virtual system (guest) emulated on a multiprocessing (MP) real system having a real main storage and a plurality of real CPUs, guest address translations being put into guest identified entries (guest entries) in a translation lookaside buffer (TLB) of any real CPU in the MP real system while the CPU is in emulation state, having a plurality of state descriptor control blocks (SDs) in main storage and each SD representing a virtual CPU and having an SD identifier (SDI) for locating the SD, the MP real system containing one or more virtual systems which may include one or more virtual UP systems (UP guests) and one or more virtual MP systems (MP guests), each UP guest having an associated SD, and each MP guest having a plurality of associated SDs, each SD in main storage being assignable to a virtual MP system or to a virtual UP system, and a CPU identifier (CPU ID) being provided for each real CPU in the MP real system, the method comprising:

locating each SD in the real main storage, providing in each SD a last CPU ID field for identifying the last real CPU to use the SD, also providing an SDI register for each real CPU, setting the SDI register of a real CPU to a SDI of a virtual CPU being dispatched upon the real CPU, comparing a previous SDI entered into the SDI register for a real CPU with the SDI of a next guest being dispatched on the real CPU, the next guest being dispatched then becomes the guest on the real CPU, also comparing the content in the last CPU ID field in the SD for the guest being dispatched with the CPU ID for the real CPU upon which the guest is being dispatched, not invalidating any guest TLB entry in the real CPU if the comparing operations find the SDI of the guest being dispatched is equal to the previous SDI in the SDI register, and if the last CPU ID field in the SD of the guest compares equal to the CPU ID of the real CPU, so that the existing guest TLB entries in the CPU are allowed to be used by the guest for a guest program, and invalidating guest TLB entries for the guest being dispatched in the real CPU while in emulation mode if the comparing operations find the last CPU ID field in the SD of the guest being dispatched is not equal to the CPU ID of the real CPU, or if the previous SDI in the SDI register compares unequal with the SDI of the guest being dispatched.

3. A method as defined in claim 2, further comprising:

providing a purge guest translation (PRGT) flag for each real CPU in the MP real system, and providing a host control program having at least one host page table in main storage, setting on the PRGT flag for each real CPU in the system when the host is invalidating a host page table entry.

4. A method as defined in claim 3, further comprising:

testing the PRGT flag for a real CPU in the MP real system on which a next guest is to be dispatched, invalidating all existing guest TLB entries in the real CPU if the testing of the PRGT flag finds it on for the real CPU, but not invalidating any existing guest TLB entries in the real CPU if the testing of the PRGT flag finds it off for the real CPU, so that the existing guest TLB entries of the real CPU can be used by the guest.

5. A method as defined in claim 4 when conditions exist for invalidating all existing guest TLB entries, further comprising:

storing the CPU ID for the real CPU in the last CPU ID field in the SD of a guest being dispatched by the host, setting the SDI registers for the CPU with the SDI of the SD of the guest being dispatched, resetting off the PRGT field for the CPU, putting the CPU in emulation state and executing a guest program on the CPU.

6. A method as defined in claim 3, further comprising:

executing an invalidate page table entry (IPTE) instruction by the host on a real CPU to set on the PRGT flag for each real CPU.

7. A method as defined in claim 6, further comprising:

an invalidate page table entry (IPTE) instruction being executed by the host on a real CPU to set on the PRGT flag for each real CPU, invalidating a page table entry specified by the IPTE instruction and any existing TLB entry used by the host (host TLB entry) in the TLB of the real CPU located by operand(s) of the IPTE instruction, broadcasting by the real CPU to other real CPUs in the MP real system of an operand representation for the IPTE instruction for the host, completing processing for the IPTE instruction when all of the other real CPUs have indicated their response.

8. A method as defined in claim 7, further comprising:

providing a guest MP control field (GMP) in real main storage for each virtual MP system (MP guest) which may execute in a real MP system, representing a virtual MP system with a plurality of SDs in a real main storage, each SD representing a virtual CPU in the virtual MP system and each SD of the virtual MP system defining a common virtual main storage for the virtual MP system, further providing a GMP address field (GMPA in each SD, each SD of a virtual MP system containing an address to the same GMP, and the content of the GMPA being changeable to allow for reassignment of each SD.

9. A method as defined in claim 8, further comprising:

having an IPTE intercept flag field in each SD, the IPTE intercept flag being set off in an SD when a guest control program of any virtual MP system is to execute a guest IPTE instruction for the virtual CPU represented by the SD.

10. A method as defined in claim 9, further comprising:

testing the state of the GMPA in the SD for a guest to determine if the SD is assigned to a virtual MP system or to a virtual UP system, executing an IPTE instruction on a real CPU for a virtual CPU if the test of the GMPA finds a zero content indicating the SD is assigned to a virtual UP system (UP guest), but executing an IPTE instruction on a real CPU for a virtual MP system (MP guest) if the test of the GMPA finds a non-zero content indicating the SD is assigned to a virtual MP system (MP guest).

11. A method as defined in claim 10, further comprising:

issuing virtual UP system being emulated on a real CPU of a real MP system, invalidating a guest page table entry specified by the guest IPTE instruction being issued, also invalidating any existing guest TLB entry for the virtual UP system on this real CPU located by operand(s) of the issued IPTE instruction to complete the execution for the guest IPTE instruction, broadcasting an IPTE signal to each other real CPU in the real MP system if the GMPA in the SD is not zero, but not broadcasting any IPTE signals to any other real CPU if the GMPA in the SD is zero, whereby the execution is completed for a UP guest issuing an IPTE instruction in a MP system.

12. A method as defined in claim 10, further comprising:

issuing a guest IPTE instruction by a guest program for a virtual MP system being emulated in a real MP system, setting to an on state a GMP addressed by the GMPA in the SD for a virtual CPU in the virtual MP system issuing the IPTE instruction, invalidating a guest page table entry specified by the issued guest IPTE instruction, also invalidating any guest TLB entry for the guest program located by operand(s) of the issued IPTE instruction in the real CPU on which the guest program is being executed for the virtual MP system, broadcasting by the real CPU executing the guest program of an address for the issued IPTE instruction to each other real CPU in the real MP system which may be emulating a virtual CPU represented by any SD of the same virtual MP system as the broadcasting CPU, resetting the GMP to an off state after all real CPUs have responded to the IPTE broadcasting to complete the processing of an IPTE instruction issued by the virtual MP system.

13. A method as defined in claim 7, each other real CPU in the real MP system receiving the broadcasting operation, further comprising:

invalidating in each other real CPU any host TLB entry located by the broadcast IPTE operation representation for invalidating a host page frame, purging a TLB entry used by a virtual CPU (guest TLB entry) in the real CPU which addresses the host page frame being invalidated if the real CPU is in emulation state, but not purging any guest TLB entry in the real CPU if the CPU is not in emulation state, responding by the other real CPU to the broadcasting CPU when the other real CPU completes processing for the broadcast IPTE instruction.

14. A method as defined in claim 13, further comprising:

trapping the IPTE broadcast signals in each other real CPU receiving an IPTE broadcast, sensing the completion of a current instruction being executed in each other real CPU receiving the IPTE broadcast signals, detecting in each other real CPU any trapped IPTE broadcast signals to determine the IPTE operand representation, invalidating any TLB entry located by the broadcast IPTE operand representation in the other real CPU receiving the IPTE broadcast signals.

15. A method as defined in claim 14, further comprising:

detecting in each real CPU receiving an IPTE broadcast if the receiving CPU is in emulation state, purging all guest TLB entries which address a host page being invalidated by a TLB entry being invalidated in the receiving CPU if emulation state is detected, signalling by the receiving CPU to the broadcasting CPU that requested IPTE processing is complete in this receiving CPU, executing a next instruction in the receiving CPU.

16. A method as defined in claim 2 when conditions exist for invalidating all existing guest TLB entries, further comprising:

storing the CPU ID for a real CPU in the last CPU ID of an SD being addressed by a host control program, setting the SDI register for the real CPU with the SDI of an SD being identified by the host program, putting the real CPU in emulation state and executing a guest program on the real CPU.

17. A method as defined in claim 16, further comprising:

an invalidate page table entry (IPTE) instruction being executed by a host program on a real CPU to invalidate a host page frame in main storage, invalidating a page table entry specified by the IPTE instruction and any corresponding host TLB entry in a TLB in a real CPU located by operand(s) of the IPTE instruction, also invalidating all affected guest TLB entries in the real CPU, broadcasting by the real CPU to other real CPUs in the MP real system of an operand representation for the IPTE instruction, completing the operation of the host IPTE instruction for the host when responses to the broadcasting operation have been received from the other real CPUs.

18. A method as defined in claim 16, further comprising:

providing a guest MP control field (GMP) in real main storage for each virtual MP system (MP guest) which may execute in the MP real system, further providing a GMP address field (GMPA) in each SD, each SD of a virtual MP system containing an address to the same GMP, testing the state of the GMPA in an SD for a zero or non-zero content to determine if the SD is in a virtual UP system or in a virtual MP system, the broadcasting operation for an IPTE instruction being required for a virtual MP system, executing an IPTE instruction for a on a real CPU for a virtual UP system without a broadcasting operation if the test of the GMPA finds a zero content, but executing an IPTE instruction for a virtual MP system if the test of the GMPA finds a non-zero content.

19. A method as defined in claim 18, further comprising:

having an IPTE intercept flag field in each SD, the IPTE intercept flag being set off in the SD when a guest program is to execute a guest IPTE instruction.

20. A method as defined in claim 19, further comprising:

issuing a guest IPTE instruction by a guest progrm dispatched for a virtual UP system being emulated on a real CPU of the MP real system, invalidating a guest page table entry specified by the guest IPTE instruction being issued, also invalidating any other guest TLB entry on the same real CPU located by operand(s) of the issued IPTE instruction, not broadcasting any IPTE signals to any other real CPU in the MP real system, whereby execution is completed for an IPTE instruction issued by a virtual UP system in a real MP system.

21. A method as defined in claim 19, further comprising:

issuing a guest IPTE instruction by a guest program of a virtual MP system being emulated by plural SDs in one or more real CPUs in the MP real system, setting to an on state a GMP addressed by the GMPA in any SD associated with the guest program issuing the IPTE instruction, invalidating a guest page table entry specified by the issued guest IPTE instruction, also invalidating any guest TLB entry located by operand(s) of the issued IPTE instruction in the real CPU on which the guest program is being executed for the virtual MP system, broadcasting by the real CPU executing the guest program of an address for the issued IPTE instruction to each other real CPU being used by the virtual MP system in the real MP system, resetting the GMP to an off state after each real CPU in the virtual MP system has responded to the IPTE broadcasting operation.

22. A method as defined in claim 21, further comprising:

trapping IPTE broadcast signals in each real CPU receiving an IPTE broadcast, sensing the completion of a current instruction being executed in each real CPU receiving IPTE broadcast signals, detecting by each real CPU having any trapped IPTE broadcast signals to determine the IPTE operand representation and if the broadcast was for the host or for a virtual MP guest, invalidating only the guest TLB entries for a particular guest identified by the IPTE broadcast signals to each receiving real CPU, but invalidating all existing guest TLB entries in the receiving real CPU if the host is identified as sending the trapped IPTE broadcast signals, also invalidating any host TLB entry from the TLB in the receiving real CPU if the host is identified as sending the trapped IPTE broadcast signals, signalling by each receiving real CPU to the broadcasting CPU that IPTE processing for the broadcast is complete in the signalling real CPU, executing a next instruction by the signalling real CPU.

23. A method as defined in claim 21, during which another real CPU in the real MP system can be used by a host program which is simulating an instruction intercepted from a guest program on a virtual CPU of a virtual MP system in the real MP system, the host program further comprising:

requesting a fetch or store request by the host program for the instruction being simulated, testing the state of a GMP accessed with a GMPA in a SD for the virtual CPU for which the instruction is being simulated by the host, setting the GMP to an on state when the test finds the GMP is in an off state, the on state of the GMP indicating to other potential users of the storage of the virtual MP system that its storage is not accessible to another request while the GMP is set to an on state, performing the fetch or store request in the storage of the virtual MP system while the GMP is in the on state, setting the GMP to off state when operations for the fetch or store request are completed, continuing with a next host program operation.

24. A method as defined in claim 23, further comprising:

causing the invalidation of guest TLB entries for a current guest on all real CPUs in a real MP by setting a predetermined value for a CPUID in the SD for the same guest.

25. A method as defined in claim 24, further comprising:

assigning an all one's value as the predetermined value.

26. A method as defined in claims 1 or 2, further comprising:

assigning a main storage address (SDA) of each SD in the system as the SDI for each SD.

* * * * *